United States Patent
Deno et al.

(10) Patent No.: US 7,731,791 B2
(45) Date of Patent: Jun. 8, 2010

(54) USE OF PYRIMIDO[5,4-G]PTERIDINES AS SHADING COMPONENT IN COLOR FILTER COLORANT COMPOSITIONS

(75) Inventors: Takashi Deno, Nishinomiya (JP); Thomas Eichenberger, Basel (CH); Joachim Voigt, Efringen-Kirchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 248 days.

(21) Appl. No.: 11/663,823

(22) PCT Filed: Sep. 21, 2005

(86) PCT No.: PCT/EP2005/054725

§ 371 (c)(1), (2), (4) Date: Mar. 26, 2007

(87) PCT Pub. No.: WO2006/037728

PCT Pub. Date: Apr. 13, 2006

(65) Prior Publication Data

US 2008/0081280 A1 Apr. 3, 2008

(30) Foreign Application Priority Data

Oct. 1, 2004 (EP) .................................. 04104816

(51) Int. Cl.
- C09B 67/22 (2006.01)
- C09B 67/20 (2006.01)
- G02F 1/1335 (2006.01)
- G02B 5/22 (2006.01)
- C08K 5/00 (2006.01)

(52) U.S. Cl. ........................ 106/498; 106/413; 106/494; 430/7; 524/88; 524/92; 524/100; 544/251

(58) Field of Classification Search ................ 106/413, 106/494, 498; 430/7; 524/100, 88, 92; 544/251
See application file for complete search history.

(56) References Cited

U.S. PATENT DOCUMENTS 4,701,455 A  10/1987  Nichol et al. ............... 514/249

(Continued)

FOREIGN PATENT DOCUMENTS

JP  5-202053  8/1993

(Continued)

OTHER PUBLICATIONS

Derwent Abstract No. 1993-285431[36] of JP 5-202053, (Aug. 1993).
Derwent Abstract No. 1994-111893[14] of JP 6-41134, (Feb. 1994).

*Primary Examiner*—Anthony J Green
(74) *Attorney, Agent, or Firm*—Joseph C. Suhadolnik

(57) ABSTRACT

The present invention relates to the field of color filters and LCDs. More specifically, the invention relates to a colorant composition for making color filters comprising pyrimido[5,4-g]pteridine derivatives of formula (I) wherein A1, A2, A3, and A4 are each independently of the others —NR1R2, wherein R1 and R2 are each independently of the others hydrogen, CrC8alkyl, —CO—C1-C8alkyl, —CO—Ce—Cuaryl, —COO—C1-C8alkyl, —COO—Ce—CMaryl, —CONH-d-Cβalkyl or —CONH—Ce-CMaryl, Or A1, A2, A3, and A4 are each independently of the others —OH, —SH, hydrogen, CrC8alkyl, CrC8alkoxy, or C6-C14aryl or —O—C6-C14aryl each unsubstituted or mono- or poly-substituted by halogen, nitro, cyano, —OR10, —SR10, —NR10R11, —CONR10R11, —COOR10, —SO2R10, —SO2NR10R11, —SO3R10, —NR11COR10 or by —NR11COOR10, wherein R10 and R11 are each independently of the others hydrogen, CrC8alkyl, C5-C12cycloalkyl or C2-C8-alkenyl; and to their use for color filter production and to color filters comprising said pyrimido[5,4-g]pteridine derivatives of formula (I).

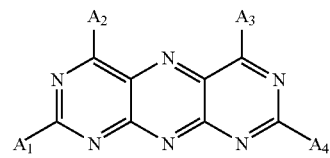

(I)

11 Claims, 4 Drawing Sheets

U.S. PATENT DOCUMENTS

| | | | |
|---|---|---|---|
| 6,120,956 A | 9/2000 | Eichenberger et al. | 430/106 |
| 6,126,735 A | 10/2000 | Eichenberger et al. | 106/498 |
| 6,600,042 B1 | 7/2003 | Eichenberger et al. | 544/251 |

FOREIGN PATENT DOCUMENTS

| | | |
|---|---|---|
| JP | 6-41134 | 2/1994 |

USE OF PYRIMIDO[5,4-G]PTERIDINES AS SHADING COMPONENT IN COLOR FILTER COLORANT COMPOSITIONS

The present invention relates to the field of color filters and LCDs. More specifically, the invention relates to a colorant composition for making color filters comprising pyrimido[5,4-g]pteridine derivatives, to their use for color filter production and to color filters comprising pyrimido[5,4-g]pteridine derivatives.

Pyrimidopteridines are known compounds. In Ann., 545, 209 (1940), H. Wieland et al. mention hydroxy-substituted pyrimidopteridines as reaction products of wing pigments of butterflies. JACS, 77, 2243-2248 (1955), an article devoted to the synthesis of amino- and hydroxy-substituted pyrimidopteridines, describes these products as sparingly soluble yellow substances. Pyrimidopteridines which are substituted at at least two nitrogen atoms of the ring system are disclosed as fluorescent pigments in JP-A 93-202046, JP-A 93-202053, JP-A 94-41135 and JP-A 95-278456. DE-A 4415656 discloses pyrimidopteridine salts as pigments.

From WO98/18866 and WO00/31079 it is known that certain pyrimidopteridine derivatives are yellow and applicable to coloration. In WO99/55707 and WO01/29040 the use of pyrimidopteridine derivatives for preparing printing inks and toners for the manufacture of color filters is mentioned.

Color filters are generally produced by forming a fine colored pattern on a transparent substrate such as glass or a reflective substrate such as silicon and metals with three coloring compositions of red, green and blue colors. Dyes have heretofore been often used in these coloring compositions. However, pigments having excellent light fastness and heat fastness, particularly, organic pigments have come to be often used in place of the dyes because the dyes have limits in light fastness and heat fastness though they are excellent in color characteristics. The colorants used as the main colorant in color filters generally do not fulfill alone the rigorous requirements of the international specifications for color filters (sRGB for computer system, NTSC, EBU, PAL, SECAM for TV systems and AdobeRGB for printing industries). For this reason, it is usual in the field to manufacture colorant compositions for color filters wherein the main colorant is combined with a shading colorant in order to adjust to a desired color.

For example, JP 01/152449A discloses that C.I. Pigment Yellow 83 and Pigment Yellow 139 are suitable as a shading component for green and red color filters. These yellow pigments provide reasonable performances as shading components in color filter applications, however, brightness and color saturation of the resultant color filters are not satisfactory.

Extensive investigations for yellow pigments have been carried out to improve both brightness and color saturation.

For example, JP 09/269410A discloses a green color filter composed of C.I. Pigment Green 36 as a main green pigment in combination with C.I. Pigment Yellow 150 as a shading component. JP 11/256053A also discloses a green color filter comprising C.I. Pigment Green 36 with C.I. Pigment Yellow 138. Green color filters composed of these combinations provide improved performances in brightness and in color saturation.

Yellow-shaded compositions for color filters are also disclosed in U.S. Pat. No. 5,821,016, wherein mixtures of Pigment Green 7, 36 or 37 and Pigment Yellow 83 or 139 are first dispersed in a solvent. For example, the ratio of Pigment Green 36 to Pigment Yellow 83 is 11:4.

EP-A-0 02 327 and U.S. Pat. No. 6,013,415 disclose radiation sensitive compositions made by dispersing in polymeric binder systems Pigment Green 36 and Pigment Yellow 83 (83:17), respectively Pigment Green 36 and Pigment Yellow 150 (60:40) or Pigment Green 7 and Pigment Yellow 83 (65:35).

Further radiation sensitive colored compositions comprising amongst other mixtures such of Pigment Green 7, 36 or 37 with Pigment Yellow 139, 150 or 185 are disclosed in U.S. Pat. No. 6,100,312.

JP-A-10/160928 discloses a coating composition for green color filters with high transmittance, comprising mixtures of Pigment Green 36 with Pigment Yellow 150 or 185 (2:1-10:9) and obtained from a powdery pigment made by finely dispersing the pigments in a solid resin.

JP-A-11/072616 discloses light sensitive compositions comprising quinophthalones such as Pigment Yellow 138, also in combination with Pigment Green 7 or 36 and optionally Pigment Yellow 93, 139 and 150. In an example, Pigment Green 36 and Pigment Yellow 93 are used in a weight ratio of 48:52.

JP-A-11/310716 disclose green resin compositions comprising a green pigment and Pigment Yellow 138, respectively Pigment Yellow 185, dispersed therein. The pigments and a binder are first dispersed together in a solvent.

JP-A-11/349840 discloses color pastes with reduced chloride content comprising Pigment Green 7, Pigment Green 36, Pigment Green 37, Pigment Yellow 93, Pigment Yellow 95, Pigment Yellow 138 or Pigment Yellow 139.

JP-A-2001/042117 discloses green compositions for color filters produced by first salt-kneading Pigment Yellow 138, then dispersing it in the compositions together with Pigment Green 36 and optionally up to 20% by weight of Pigment Yellow 150.

Finally, WO-98/45756 discloses highly transparent colored compositions useful in color filters, comprising amongst others disazo yellow and amino-substituted phthalocyanine pigments (chosen according to their symmetry or asymmetry). The particles are extremely fine.

However, there still exists a need for higher color saturation, brightness and for an increased contrast ratio for reproducing better color images in display applications, in particular in TV and high definition TV applications with highly saturated color specifications. In principle higher color saturation is achievable by increasing the pigment content and/or by increasing the layer thickness. However, the layer thickness of these color filters is going to reach a process limit at a highly saturated color. Another approach is to increase the color saturation by substractive shading the main color. For example and as discussed above, a blue shaded green pigment can be shaded with a yellow shading colorant. Prior art yellow shading colorants, for example Pigment Yellow 138 and 150, are limited in its capability to increase color saturation of a main colorant, for example a blue shaded main colorant. The limitation with regard to color saturation of the main colorant in color filters comprising state of the art colorant compositions prevents a further reduction of the layer thickness of color filters in order to meet the higher demands on color filters nowadays.

In view of the state of the art, there is a demand for a yellow shading component for the manufacture of color filters having superior color saturation strength, higher brightness and an increased contrast ratio. At the same time, such shading colorant must also meet the high requirements of the color filter industry regarding properties like, for example, thermal stability and durability.

Figure 1:
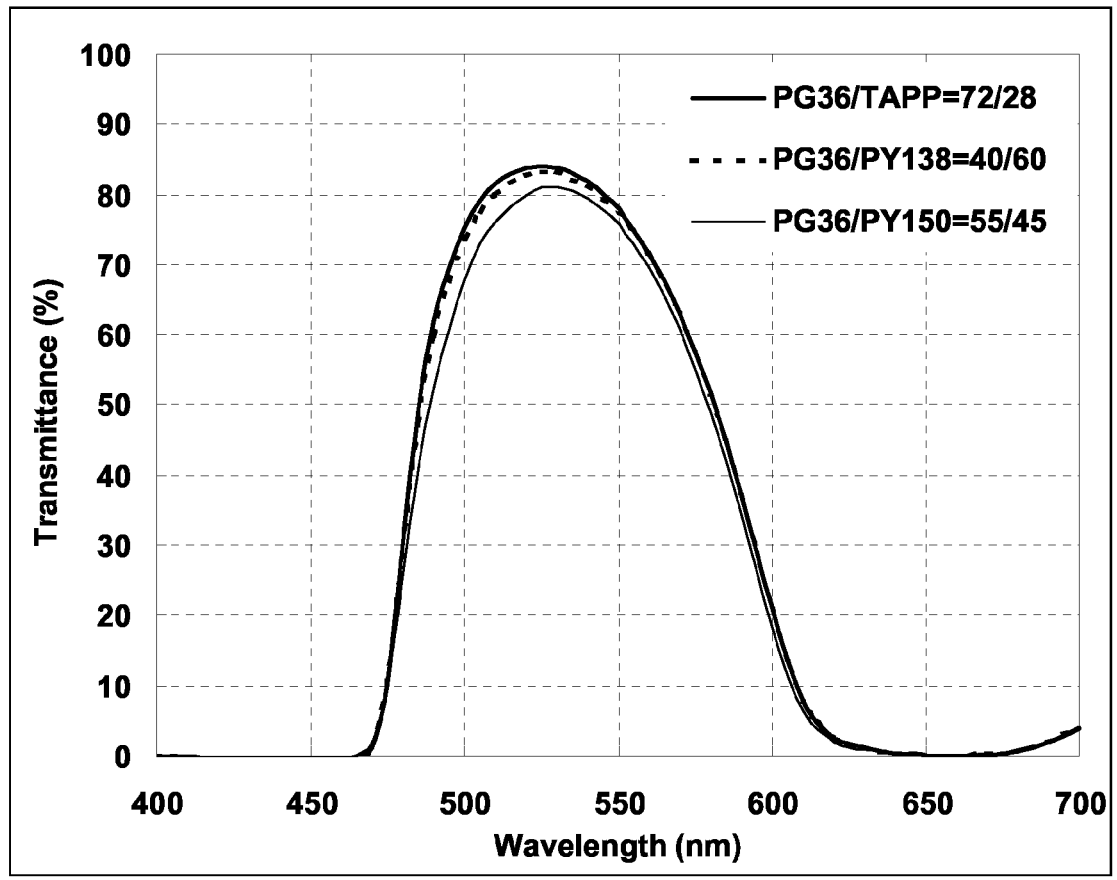
FIG. 1 shows the visible transmission spectra of a green dispersion film prepared according to the instant invention comprising C.I. PG 36 and the TAPP of formula I vs green dispersion films of the existing art, comprising C.I. PG 36 and either C.I. PY138 or C.I. PY150, wherein the films are adjusted to give a color with an x and y value of x=0.290, y=0.600, which is EBU specification widely adopted as the standard color for TV system film.

It was surprisingly found that pyrimido[5,4-g]pteridine derivatives of formula (I)

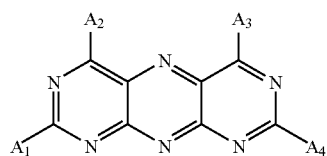

(I)

wherein $A_1$, $A_2$, $A_3$, and $A_4$ are each independently of the others

—$NR_1R_2$, wherein $R_1$ and $R_2$ are each independently of the others hydrogen, $C_1$-$C_8$alkyl, —CO—$C_1$-$C_8$alkyl, —CO—$C_6$-$C_{14}$aryl, —COO—$C_1$-$C_8$alkyl, —COO—$C_6$-$C_{14}$aryl, —CONH—$C_1$-$C_8$alkyl or —CONH—$C_6$-$C_{14}$aryl, or —OH, —SH, hydrogen, $C_1$-$C_8$alkyl, $C_1$-$C_8$alkoxy, or $C_6$-$C_{14}$aryl or —O—$C_6$-$C_{14}$aryl each unsubstituted or mono- or poly-substituted by halogen, nitro, cyano, —$OR_{10}$, —$SR_{10}$, —$NR_{10}R_{11}$, —$CONR_{10}R_{11}$, —$COOR_{10}$, —$SO_2R_{10}$, —$SO_2NR_{10}R_{11}$, —$SO_3R_{10}$, —$NR_{11}COR_{10}$ or by —$NR_{11}COOR_{10}$, wherein $R_{10}$ and $R_{11}$, are each independently of the others hydrogen, $C_1$-$C_8$alkyl, $C_5$-$C_{12}$cycloalkyl or $C_2$-$C_8$alkenyl;

are suitable as shading colorants in combination with one or more colorants in a color filter colorant composition. The inventive shading provides for an increase in color saturation of the main colorant and as a result, an increase of brightness, an increase of contrast ratio and a decrease of the layer thickness of the resultant color filter.

In a first embodiment, the instant invention therefore relates to the use of pyrimido[5,4-g]pteridine derivatives of formula (I) as a shading component in combination with one or more main colorants in color filter colorant compositions to achieve higher color saturation of the main colorant and to give thinner layers with improved brightness and contrast ratio than state of the art colorant combinations satisfying the above-mentioned higher requirements of the industry.

In a more preferred embodiment, the instant invention relates to the use of pyrimido[5,4-g]pteridine derivatives of formula (I) as a shading component in combination with one or more main colorants in color filter colorant compositions wherein said main colorant is either a green colorant or a red colorant.

In another embodiment, the instant invention relates to a colorant composition for making color filters comprising at least one colorant is selected from the group consisting of phthalocyanine, subphthalocyanine, naphthalocyanine, dioxazine, indanthrone, indigo, anthraquinone, quinacridone, diketopyrrolopyrrole, dithioketopyrrolopyrrole, indigo, thioindigo, perylene, perinone, monoazo, disazo, beta-naphthol, benzimidazolone, disazo condensation, isoindolinone, isoindoline, anthrapyrimidine, flavanthrone, pyranthrone, anthanthrone, triarylcarbonium, quinophthalone pigments and dyes, lake pigments, metal complexes, inorganic pigments and dyes.

More preferably, the at least one colorant of the inventive colorant composition is selected from the group consisting of (i) green or blue colorants; preferably C. I. Pigment Green 7 and 36, and C. I. Acid Green 3, 9 and 16, and C. I. Basic Green 1 and C. I. Pigment Blue 15, 15:1, 15:2, 15:3, 15:4, 15:6, 16, 22, 28, 60, 63, 64, 66, 75 and 80, and C. I. Solvent Blue 25, 49, 68, 78 and 94, and C. I. Direct Blue 25, 86, 90 and 108, and C. I. Acid Blue 1, 7, 9, 15, 103, 104, 158 and 161, and C. I. Basic Blue 1, 3, 9 and 25, and C. I. Disperse Blue 198; and (ii) red or violet colorants; preferably C. I. Pigment Red 9, 97, 105, 122, 123, 144, 149, 168, 176, 177, 179, 180, 185, 192, 202, 206, 207, 209, 214, 222, 242, 244, 254, 255, 264 and 272, C. I. Solvent Red 25, 27, 30, 35, 49, 83, 89, 100, 122, 138, 149, 150, 160, 179, 218 and 230, and C. I. Direct Red 20, 37, 39 and 44, and C. I. Acid Red 6, 8, 9, 13, 14, 18, 26, 27, 51, 52, 87, 88, 89, 92, 94, 97, 111, 114, 115, 134, 145, 151, 154, 180, 183, 184, 186 and 198, and C. I. Basic Red 12 and 13, and C. I. Disperse Red 5, 7, 13, 17 and 58, C. I. Pigment Violet 14, 19, 23, 29, 32, 37 and 42.

"C.I." refers to the Colour Index, known to the person skilled in the art and publicly available.

Pyrimido[5,4-g]pteridine derivatives of formula (I) are also useful in inventive colorant composition in combination with one or more additional yellow colorants in order to better achieve precise color adjustment. Preferably, the additional yellow colorant is selected from the group consisting of C. I. Pigment Yellow 12, 13, 14, 17, 20, 24, 31, 53, 55, 83, 93, 95, 109, 110, 117, 125, 128, 129, 138, 139, 147, 150, 153, 154, 155, 166, 168, 180, 185, 199, 213, C. I. Solvent Yellow 2, 5, 14, 15, 16, 19, 21, 33, 56, 62, 77, 83, 93, 162, 104, 105, 114, 129, 130, 162, C. I. Disperse Yellow 3, 4, 7, 31, 54, 61, 201, C. I. Direct Yellow 1, 11, 12, 28, C. I. Acid Yellow 1, 3, 11, 17, 23, 38, 40, 42, 76, 98, C. I. Basic Yellow 1, C. I. Direct Brown 6, 58, 95, 101, 173, and C. I. Acid Brown 14.

Preferred green or blue colorants, in particular green colorants are, for example, optionally halogenated metal phthalocyanines wherein the metal is Cu, Al, Si, Ti, V, Fe, Co, Ni, Zn, Ga, Ge, Y, Zr, Nb, In, Sn, Pb or Pd and wherein said metal is optionally complexed with one or more additional ligands, for example oxo, halo and hydroxy. Suitable optionally halogenated metal phthalocyanines are described in JP 2003-161828A. Further preferred green colorants, in particular bluish green colorants are benzyloxy-, alkoxy- or hydoroxy-substituted phthalocyanines; for example those described in WO 2004/018477; subphthalocyanines, for example those described in JP 2004-10838A.

The colorant composition of the present invention is particularly suitable for making green color filters in combination with the above-mentioned blue or green colorants, in particular in combination with green colorants. Preferably, the main colorant is a phthalocyanine of formula (II)

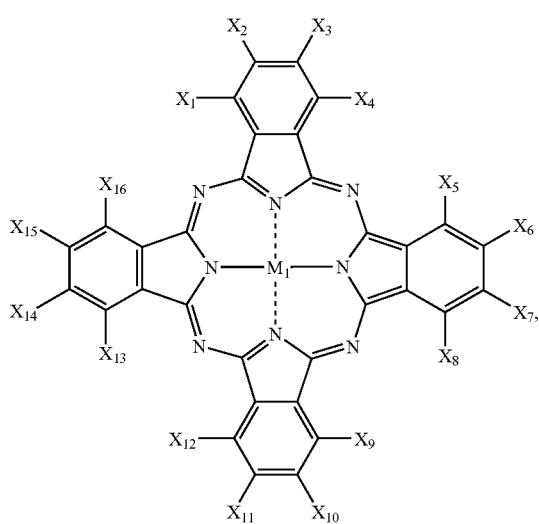

(II)

wherein $M_1$ is $H_2$, Cu, Zn, Fe, Ni, Pd, VO, MnO and TiO and $X_1$ to $X_{16}$ are independently of each other H, Br or Cl.

It is even more preferred when at least one of $X_1$ to $X_{16}$ is chlorine or bromine. Examples of compounds of formula (II) include Pigment Green 7, Pigment Green 36 and Pigment Green 37. Preferably, $M_1$ is Cu and/or from 4 to 16 (most preferred from 8 to 16) of $X_1$ to $X_{16}$ are Cl, and none or from 1 to 16 of $X_1$ to $X_{16}$ is Br.

Especially preferred green main colorants according to the instant invention are C. I. Pigment Green 7 and 36 and further halogenated zinc and halogenated nickel phthalocyanines. Even more preferred is a green composition wherein 2,4,6,8-tetraaminopyrimido[5,4-g]pteridine is combined with a halogenated copper phthalocyanine, for example C. I. Pigment Green 7 and 36, or a halogenated (preferably chlorinated and/or brominated) zinc phthalocyanine.

Preferred red or violet colorants, in particular red colorants, are polycyclic pigments selected form the group consisting of perylene, diketopyrrolo-pyrrole, quinacridone, anthraquinone, indigo, thioindigo, perinone, azo, benzimidazolone and dioxazine pigments.

Also, colorant compositions are preferred wherein at least one colorant is C. I. Pigment Red 177, 185, 254, 255, 264 or 272 and more preferably wherein at least one colorant is C. I. Pigment Red 177 or 254. Compositions comprising pyrimido [5,4-g]pteridine derivatives of formula (I) in combination with C. I. Pigment Red 177 or 254 are especially suitable for high brightness red color filters, in particular for TV application where high color purity is required. Other combinations wherein the resulting color is more orangish are also suitable, for example for low power consumption devices such as mobile phones and backlight-less reflection type LCD.

Preferably, the at least one pyrimido[5,4-g]pteridine derivative of the inventive colorant composition is defined by formula (I) wherein $A_1, A_2, A_3$ and $A_4$ are each independently of each other hydrogen, hydroxy, methoxy, ethoxy, methyl, ethyl, phenyl, p-aminophenyl, p-aminoaminophenyl, p-dimethylaminophenyl or p-diethylaminophenyl, $NH_2$, $NHR_{12}$, $NR_{12}R_{13}$, $NH_2$, $NHR_{12}$ or $NR_{12}R_{13}$, wherein $R_{12}$ and $R_{13}$ are hydrogen, methyl, ethyl, phenyl, p-aminophenyl, p-dimethylaminophenyl, p-diethylaminophenyl, p-methoxyphenyl or p-ethoxyphenyl.

Even more preferred is a colorant composition wherein in formula (I) of the at least one pyrimido[5,4-g]pteridine derivative $A_1, A_2, A_3$ and $A_4$ are $NH_2$.

Even more preferred is a red or green colorant composition wherein 2,4,6,8-tetraaminopyrimido[5,4-g]pteridine is combined with (i) C. I. Pigment Green 7, 36, a chlorinated and/or a brominated zinc phthalocyanine; or (ii) C. I. Pigment Red 177, 185, 254, 255, 264, and/or 272.

Further, colorant compositions are preferred comprising (a) from 0.05 to 70% by weight, based on the sum of (a) and (b), of at least one pyrimido[5,4-g]pteridine derivative of formula (I), and (b) from 30 to 99.95% by weight, based on the sum of (a) and (b), of at least one of the aforementioned main colorants.

Preferably, the colorant composition further comprises at least one polymeric dispersant and/or at least one pigment derivative.

In another embodiment, the present invention also relates to the use of the inventive colorant composition as a colorant in a manufacturing process for making of color filters. Preferably, said manufacturing process is based on photolithography, inkjet printing, offset printing, gravure printing, relief printing, screen printing, stamp printing, continuous reversal printing and/or electrodeposition.

The colorant composition of the present invention can generally be used in the manufacture of color filters as a dispersion in an organic solvent or in water. There are several ways to manufacture these color filters, which follow two mainstreams: (a) direct patterning during applying and (b) patterning after applying the pigment.

Direct patterning can be obtained by several printing techniques, such as impact (off-set, flexography, gravure, relief, screen, stamping, letterpress etc.) as well as non-impact (e.g. ink jet techniques).

Other direct patterning techniques are based on lamination processes, electronic discharging processes like electrodeposition and some special color proofing methods, like the so-called Chromalin™ process (DuPont).

For impact printing techniques, the pigment may be dispersed in water or organic solvents by standard de-agglomeration methods (Skandex, Dynamill, Dispermat, Drais and the like) in the presence of a dispersant and a polymeric binder to produce an ink. Any dispersion technique known in the field, including the choice of solvent, dispersant and binder, can be used. The type of ink and its viscosity depend on the application technique and are well known to the skilled artisan. Most usual binders, to which the invention is of course not limited, are (meth)acrylates, epoxies, PVA, polyimids, Novolak systems and the like as well as combinations of these polymers.

The ink dispersion then can be printed on all kind of standard printing machines. A heating process preferably achieves curing of the binder system. The three colors can be applied at once or in different printing steps with intermediate drying and/or curing steps, for example one color at the time in three printing steps.

Inks for use in ink jet, for example piezo or bubble jet, can be prepared likewise. They generally contain a pigment dispersed in water and/or one or a mixture of many hydrophilic organic solvents in combination with a dispersant and a binder.

For ink jet printing a standard ink jet printer can be used or a dedicated printer can be built in order to optimize for example the printing speed etc.

For lamination techniques, like thermal transfer and the like, a web system has to be made: The pigment is dispersed in a solvent or water with dispersant and binder and coated on a foil and dried. The pigment/binder system can be patternwise or uniformly transferred to a color filter substrate with the help of energy (UV, IR, heat, pressure etc.). Depending on the technique used, the colorant for example may be transferred alone (dye diffusion or sublimation transfer), or the colorant dispersion may be entirely transferred including the binder (wax transfer).

For electrodeposition, the pigment has to be dispersed in water together with an ionized polymer. By means of an electrical current, the ionized polymer is deionized at the anode or the cathode and, being insoluble then, deposited together with the pigments. This can be done on patterned or patternwise shielded, by a photoresist, (transparent) photoconductors like ITO etc.

The Chromalin™ process makes use of a photosensitive material, deposited on a color filter substrate. The material becomes tacky upon UV exposure. The so-called 'toner', comprising a mixture or compound of pigment and polymer, is distributed on the substrate and sticks on the tacky parts. This process has to be done three to four times for R, G, B and eventually black.

Patterning after applying is a method based mostly on the known photoresist technology, wherein the pigment is dispersed in the photoresist composition. Other methods are indirect patterning with the help of a separate photoresist or lamination techniques. The pigment may be dispersed into photoresists by any standard method such as described above for the printing processes. The binder systems may also be identical. Further suitable compositions are described for example in EP-B-654711, WO-98/45756 or WO-98/45757.

Photoresists comprise a photoinitiator and a polycrosslinkable monomer (negative radical polymerization), a material to crosslink the polymers itself (for example a photoacid generator or the like) or a material to chemically change the solubility of the polymer in certain developing media. This process, however, can also be done with heat (for example using thermal arrays or an NIR beam) instead of UV, in the case of some polymers, which undergo chemical changes during heating processes, resulting in changes of solubility in the mentioned developing media. There is then no need for a photoinitiator.

The photosensitive or heat sensible material is coated on a color filter substrate, dried and UV (or heat) irradiated, sometimes again baked (photoacid generators) and developed with a developing medium (mostly a base). In this last step only the non-exposed (negative systems) or only the exposed (positive systems) parts are washed away, giving the wanted pattern. This operation has to be repeated for all the colors used.

Photosensitive lamination techniques are using the same principle, the only difference being the coating technique. A photosensitive system is applied as described above, however on a web instead of a color filter substrate. The foil is placed on the color filter substrate and the photosensitive layer is transferred with the help of heat and/or pressure.

Indirect processes, with the above-mentioned polymeric binders without a photosensitive component, make use of an extra photoresist, coated on top of the pigmented resist. During the patterning of the photoresist, the pigmented resist is patterned as well. The photoresist has to be removed afterwards.

As the binder used in the color filter resist composition, which is soluble in an alkaline aqueous solution and insoluble in water, for example, a homopolymer of a polymerizable compound having one or more acid groups and one or more polymerizable unsaturated bonds in the molecule, or a copolymer of two or more kinds thereof, and a copolymer of one or more polymerizable compounds having one or more unsaturated bonds copolymerizable with these compounds and containing no acid group, can be used. Such compounds can be obtained by copolymerizing one or more kinds of a low molecular compound having one or more acid groups and one or more polymerizable unsaturated bonds in the molecule with one or more polymerizable compounds having one or more unsaturated bonds copolymerizable with these compounds and containing no acid group. Examples of acids groups are, a —COOH group, a —$SO_3H$ group, a —$SO_2$NHCO— group, a phenolic hydroxy group, a —$SO_2$NH— group, and a —CO—NH—CO— group. Among those, a high molecular compound having a —COOH group is particularly preferred.

Preferably, the organic polymer binder in the color filter resist composition comprises an alkali soluble copolymer comprising, as addition polymerizable monomer units, at least an unsaturated organic acid compound such as acrylic acid, methacrylic acid and the like. It is preferred to use as a further co-monomer for the polymer binder an unsaturated organic acid ester compound such as methyl acrylate, ethyl (meth)acrylate, benzyl(meth)acrylate, styrene and the like to balance properties such as alkaline solubility, adhesion rigidity, chemical resistance etc.

The organic polymer binder can either be a random copolymer or a block-co-polymer, for example, such as described in U.S. Pat. No. 5,368,976.

Examples of polymerizable compounds having one or more acid group and one or more polymerizable unsaturated bond in the molecule include the following compounds:

Examples of the polymerizable compounds having one or more —COOH groups and one or more polymerizable unsaturated bonds in a molecule are (meth)acrylic acid, 2-carboxyethyl (meth)acrylic acid, 2-carboxypropyl(meth)acrylic acid, crotonic acid, cinnamic acid, mono[2-(meth)acryloyloxyethyl]succinate, mono[2-(meth)acryloyloxyethyl]adipate, mono[2-(meth)acryloyloxyethyl]phthalate, mono[2-(meth)acryloyloxyethyl]hexahydrophthalate, mono[2-(meth)acryloyloxyethyl]maleate, mono[2-(meth)acryloyloxypropyl]succinate, mono[2-(meth)acryloyloxypropyl]adipate, mono[2-(meth)acryloyloxypropyl]phthalate, mono[2-(meth)acryloyloxypropyl]hexahydrophthalate, mono[2-(meth)acryloyloxypropyl]maleate, mono[2-(meth)acryloyloxybutyl]succinate, mono[2-(meth)acryloyloxybutyl]adipate, mono[2-(meth)acryloyloxybutyl]phthalate, mono[2-(meth)acryloyloxybutyl]hexahydrophthalate, mono[2-(meth)acryloyloxybutyl]maleate, 3-(alkylcarbamoyl)acrylic acid, a-chloroacrylic acid, maleic acid, monoesterified maleic acid, fumaric acid, itaconic acid, citraconic acid, mesaconic acid, maleic anhydride, and w-carboxypolycaprolactone mono(meth)acrylate.

Vinylbenzenesulfonic acid and 2-(meth)acrylamide-2-methylpropanesulfonic acid are examples of the polymerizable compounds having one or more —$SO_3H$ groups and one or more polymerizable unsaturated bonds.

N-methylsulfonyl(meth)acrylamide, N-ethylsulfonyl (meth)acrylamide, N-phenylsulfonyl (meth)acrylamide, and N-(p-methylphenylsulfonyl) (meth)acrylamide are examples of the polymerizable compounds having one or more —$SO_2$NHCO— groups and one or more polymerizable unsaturated bonds.

Examples of polymerizable compounds having one or more phenolic hydroxy groups and one or more polymerizable unsaturated bonds in a molecule include hydroxyphenyl (meth)acrylamide, dihydroxyphenyl(meth)acrylamide, hydroxyphenylcarbonyloxyethyl (meth)acrylate, hydroxyphenyloxyethyl(meth)acrylate, hydroxyphenylthioethyl (meth)acrylate, dihydroxyphenylcarbonyloxyethyl(meth) acrylate, dihydroxyphenyloxyethyl (meth)acrylate, and dihydroxy-phenylthioethyl(meth)acrylate.

Examples of the polymerizable compound having one or more —SO$_2$NH— groups and one or more polymerizable unsaturated bonds in the molecule include compounds represented by formula (a) or (b):

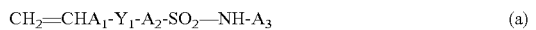   (a)

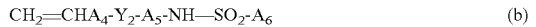   (b)

wherein Y$_1$ and Y$_2$ each represents —COO—, —CONA$_7$-, or a single bond; A$_1$ and A$_4$ each represents H or CH$_3$; A$_2$ and A$_5$ each represents C$_1$-C$_{12}$alkylene optionally having a substituent, cycloalkylene, arylene, or aralkylene, or C$_2$-C$_{12}$alkylene into which an ether group and a thio-ether group are inserted, cycloalkylene, arylene, or aralkylene; A$_3$ and A$_6$ each represents H, C$_1$-C$_{12}$alkyl optionally having a substituent, a cycloalkyl group, an aryl group, or an aralkyl group; and A$_7$ represents H, C$_1$-C$_{12}$alkyl optionally having a substituent, a cycloalkyl group, an aryl group, or an aralkyl group.

The polymerizable compounds having one or more —CO—NH—CO— group and one or more polymerizable unsaturated bond include maleimide and N-acryloyl-acrylamide. These polymerizable compounds become the high molecular compounds comprising a —CO—NH—CO— group, in which a ring is formed together with a primary chain by polymerization. Further, a methacrylic acid derivative and an acrylic acid derivative each having a —CO—NH—CO— group can be used as well. Such methacrylic acid derivatives and the acrylic acid derivatives include, for example, a methacrylamide derivative such as N-acetylmethacrylamide, N-propionylmethacrylamide, N-butanoylmethacrylamide, N-pentanoylmethacrylamide, N-decanoylmethacrylamide, N-dodecanoylmethacrylamide, N-benzoylmethacrylamide, N-(p-methylbenzoyl)methacryl-amide, N-(p-chlorobenzoyl)methacrylamide, N-(naphthyl-carbonyl)methacrylamide, N-(phenylacetyl)-methacryl-amide, and 4-methacryloylaminophthalimide, and an acrylamide derivative having the same substituent as these. These polymerizable compounds polymerize to be compounds having a —CO—NH—CO— group in a side chain.

Examples of polymerizable compounds having one or more polymerizable unsaturated bond and containing no acid group include a compound having a polymerizable unsaturated bond, selected from esters of (meth)acrylic acid, such as methyl(meth)acrylate, ethyl (meth)acrylate, propyl(meth) acrylate, butyl(meth)acrylate, tetrahydrofurfuryl(meth)acrylate, benzyl(meth)acrylate, 2-ethylhexyl(meth)acrylate, hydroxyethyl(meth)acrylate, hydroxypropyl(meth)acrylate, hydroxybutyl(meth)acrylate, glycerol mono(meth)acrylate, dihydroxypropyl(meth)acrylate, allyl(meth)acrylate, cyclohexyl(meth)acrylate, phenyl (meth)acrylate, methoxyphenyl (meth)acrylate, methoxyethyl(meth)acrylate, phenoxyethyl (meth)acrylate, methoxydiethyleneglycol (meth)acrylate, methoxytriethyleneglycol (meth)acrylate, methoxypropyl (meth)acrylate, methoxydipropyleneglycol (meth)acrylate, isobornyl meth(acrylate), dicyclopentadienyl(meth)acrylate, 2-hydroxy-3-phenoxypropyl (meth)acrylate, tricyclo[5.2.1.02,6]decan-8-yl(meth)acrylate, aminoethyl(meth) acrylate, N,N-dimethylaminoethyl(meth)acrylate, aminopropyl(meth)acrylate, N,N-dimethylaminopropyl (meth) acrylate, glycidyl(meth)acrylate, 2-methylglycidyl(meth) acrylate, 3,4-epoxybutyl (meth)acrylate, 6,7-epoxyheptyl (meth)acrylate; vinyl aromatic compounds, such as styrene, α-methylstyrene, vinyltoluene, p-chlorostyrene, polychlorostyrene, fluorostyrene, bromostyrene, ethoxymethyl styrene, methoxystyrene, 4-methoxy-3-methystyrene, dimethoxystyrene, vinylbenzyl methyl ether, vinylbenzyl glycidyl ether, indene, 1-methylindene; vinyl or allyl esters, such as vinyl acetate, vinyl propionate, vinyl butylate, vinyl pivalate, vinyl benzoate, vinyl trimethylacetate, vinyl diethylacetate, vinyl barate, vinyl caproate, vinyl chloroacetate, vinyl dichloroacetate, vinyl methoxyacetate, vinyl butoxyacetate, vinyl phenylacetate, vinyl acetate, vinyl acetoacetate, vinyl lactate, vinyl phenylbutylate, vinyl cyclohexylcarboxylate, vinyl salicylate, vinyl chlorobenzoate, vinyl tetrachlorobenzoate, vinyl naphthoate, allyl acetate, allyl propionate, allyl butylate, allyl pivalate, allyl benzoate, allyl caproate, allyl stearate, allyl acetoacetate, allyl lactate; vinyl or allyl ethers, such as vinyl methyl ether, vinyl ethyl ether, vinyl hexyl ether, vinyl octyl ether, vinyl ethylhexyl ether, vinyl methoxyethyl ether, vinyl ethoxyethyl ether, vinyl chloroethyl ether, vinyl hydroxyethyl ether, vinyl ethybutyl ether, vinyl hydroxyethoxyethyl ether, vinyl dimethylaminoethyl ether, vinyl diethylaminoethyl ether, vinyl butylaminoethyl ether, vinyl benzyl ether, vinyl tetrahydrofurfuryl ether, vinyl phenyl ether, vinyl tolyl ether, vinyl chlorophenyl ether, vinyl chloroethyl ether, vinyl dichlorophenyl ether, vinyl naphthyl ether, vinyl anthryl ether, allyl glycidyl ether; amide type unsaturated compounds, such as (meth)acrylamide, N,N-dimethyl(meth)acrylamide, N,N-diethyl(meth)acrylamide, N,N-dibutyl(meth)acrylamide, N,N-diethylhexyl(meth) acrylamide, N,N-dicyclohexyl (meth)acrylamide, N,N-diphenyl(meth)acrylamide, N-methyl-N-phenyl(meth)acrylamide, N-hydroxyethyl-N-methyl(meth)acrylamide, N-methyl(meth)acrylamide, N-ethyl (meth)acrylamide, N-propyl(meth)acrylamide, N-butyl(meth)acrylamide, N-hydroxyethyl (meth)acrylamide, N-heptyl(meth)acrylamide, N-octyl(meth)acrylamide, N-ethyhexyl (meth)acrylamide, N-hydroxyethyl(meth)acrylamidecyclohexyl, N-benzyl(meth)acrylamide, N-phenyl(meth)acrylamide, N-tolyl (meth)acrylamide, N-hydroxyphenyl(meth)acrylamide, N-naphthyl(meth)acrylamide, N-phenylsulfonyl(meth)acrylamide, N-methylphenylsulfonyl (meth)acrylamide and N-(meth)acryloylmorpholine, diacetone acrylamide, N-methylol acrylamide, N-butoxyacrylamide; polyolefin type compounds, such as butadiene, isoprene, chloroprene and the like; (meth)acrylonitrile, methyl isopropenyl ketone, maleimide, N-phenylmaleimide, N-methylphenylmaleimide, N-methoxyphenylmaleimide, N-cyclohexylmaleimide, N-alkylmaleimide, maleic anhydride, polystyrene macromonomer, polymethyl(meth)acrylate macromonomer, polybutyl(meth)acrylate macromonomer; crotonates, such as butyl crotonate, hexyl crotonate, glycerine monocrotonate; and itaconates, such as dimethyl itaconate, diethyl itaconate, dibutyl itaconate; and maleates or fumarates, such as dimethyl mareate, dibutyl fumarate.

Preferable examples of copolymers are copolymers of methyl(meth)acrylate and (meth)acrylic acid, copolymers of benzyl(meth)acrylate and (meth)acrylic acid, copolymers of methyl(meth)acrylate/, ethyl(meth)acrylate and (meth) acrylic acid, copolymers of benzyl (meth)acrylate, (meth) acrylic acid and styrene, copolymers of benzyl(meth)acrylate, (meth)acrylic acid and 2-hydroxyethyl(meth)acrylate, copolymers of methyl(meth)acrylate/, butyl(meth)acrylate, (meth)acrylic acid and styrene, copolymers of methyl(meth) acrylate, benzyl(meth)acrylate, (metha)crylic acid and hydroxyphenyl(meth)acrylate, copolymers of methyl(meth) acrylate, (metha)crylic acid and polymethyl(meth)acrylate macromonomer, copolymers of benzyl(meth)crylate, (metha)crylic acid and polymethyl(meth)acrylate macromonomer, copolymers of tetrahydrofurfuryl(meth)acrylate, styrene and (meth)acrylic acid, copolymers of methyl(meth)acrylate, (meth)acrylic acid and polystyrene macromonomer, copolymers of benzyl(meth)acrylate, (meth)acrylic acid and polystyrene macromonomer, copolymers of benzyl(meth)acrylate, (meth)acrylic acid, 2-hydroxyethyl (meth)acrylate and polystyrene macromonomer, copolymers of benzyl(meth)acrylate, (meth)acrylic acid, 2-hydroxypropyl(meth)acrylate and polystyrene macromonomer, copolymers of benzyl (meth)acrylate, (meth)acrylic acid, 2-hydroxy-3-phenoxypropyl (meth)acrylate and polymethyl(meth)acrylate macromonomer, copolymers of methyl (meth)acrylate, (meth) acrylic acid, 2-hydroxyethyl(meth)acrylate and polystyrene macromonomer, copolymers of benzyl(meth)acrylate, (metha)crylic acid, 2-hydroxyethyl (meth)acrylate and polymethyl(meth)acrylate macromonomer, copolymers of N-phenylmaleimide, benzyl(meth)acrylate, (metha)crylic acid and styrene, copolymers of benzyl(meth)acrylate, (meth)acrylic acid, N-phenylmaleimide, mono-[2-(meth) acryloyloxyethyl]succinate and styrene, copolymers of allyl (meth)acrylate, (meth)acrylic acid, N-phenylmaleimide, mono-[2-(meth)acryloyloxyethyl]succinate and styrene, copolymers of benzyl(meth)acrylate, (meth)acrylic acid, N-phenylmaleimide, glycerol mono(meth)acrylate and styrene, copolymers of benzyl(meth)acrylate, ω-carboxypolycaprolactone mono(meth)acrylate, (meth)acrylic acid, N-phenylmaleimide, glycerol mono(meth)acrylate and styrene, and copolymers of benzyl(meth)acrylate, (meth)acrylic acid, N-cyclohexylmaleimide and styrene.

There can be used as well hydroxystyrene homo- or copolymers or a novolak type phenol resin, for example, poly (hydroxystyrene) and poly(hydroxystyrene-co-vinylcyclohexanol), a novolak resin, a cresol novolak resin, and a halogenated phenol novolak resin. More specifically, it includes, for example, the methacrylic acid copolymers, the acrylic acid copolymers, the itaconic acid copolymers, the crotonic acid copolymers, the maleic anhydride co-polymers, for example, with styrene as a co-monomer, and maleic acid copolymers, and partially esterified maleic acid copolymers each described in, for example, JP 59-44615-B4 (the term "JP-B4" as used herein refers to an examined Japanese patent publication), JP 54-34327-B4, JP 58-12577-B4, and JP 54-25957-B4, JP 59-53836-A, JP 59-71048-A, JP 60-159743-A, JP 60-258539-A, JP 1-152449-A, JP 2-199403-A, and JP 2-199404-A, and which copoly-mers can be further reacted with an amine, as e.g disclosed in U.S. Pat. No. 5,650,263; further, a cellulose derivative having a carboxyl group on a side chain can be used, and particularly preferred are copolymers of benzyl(meth)acrylate and (meth) acrylic acid and copolymers of benzyl(meth)acrylate, (meth) acrylic acid and other monomers, for example as described in U.S. Pat. No. 4,139,391, JP 59-44615-B4, JP 60-159743-A and JP 60-258539-A.

With respect to those having carboxylic acid groups among the above organic binder polymers, it is possible to react some or all of the carboxylic acid groups with glycidyl(meth)acrylate or an epoxy(meth)acrylate to obtain photopolymerizable organic binder polymers for the purpose of improving the photosensitivity, coating film strength, the coating solvent and chemical resistance and the adhesion to the substrate. Examples are disclosed in JP 50-34443-B4 and JP 50-34444-B4, U.S. Pat. No. 5,153,095, by T. Kudo et al. in J. Appl. Phys., Vol. 37 (1998), p. 3594-3603, U.S. Pat. No. 5,677,385, and U.S. Pat. No. 5,650,233.

The weight-average molecular weight of the binders is preferably 500 to 1,000,000, e.g. 3,000 to 1,000,000, more preferably 5,000 to 400,000.

These compounds may be used singly or as a mixture of two or more kinds. The content of the binder in the light-sensitive resin composition is preferably 10 to 95 weight %, more preferably 15 to 90 weight % based on the whole solid matters.

In a further embodiment, the present invention also relates to a polymerizable mixture for making color filters comprising at least one of the inventive colorant compositions described above together with at least one ethylenically unsaturated polymerizable compound.

Preferably, the polymerizable mixture further comprises at least one photoinitiator and can be photopolymerized upon irradiation.

The at least one ethylenically unsaturated compound comprises compounds having one or more olefinic double bonds. They may be of low (monomeric) or high (oligomeric) molecular mass. Examples of compounds containing a double bond are (meth)acrylic acid, alkyl, hydroxyalkyl or aminoalkyl(meth)acrylates, for example methyl, ethyl, n-butyl, isobutyl, tert-butyl, n-propyl, isopropyl, n-hexyl, cyclohexyl, 2-ethylhexyl, isobornyl, benzyl, 2-hydroxyethyl, 2-hydroxypropyl, methoxyethyl, ethoxyethyl, glycerol, phenoxyethyl, methoxydiethylene glycol, ethoxydiethylene glycol, polyethylene glycol, polypropylene glycol, glycidyl, N,N-dimethylaminoethyl, and N,N-diethylaminoethyl (meth)acrylates. Other examples are (meth)acrylonitrile, (meth)acrylamide, N-substituted (meth)acrylamides such as N,N-dimethyl (meth)acrylamide, N,N-diethyl(meth)acrylamide, N,N-dibutyl(meth)acrylamide, N-methyl (meth)acrylamide, N-ethyl(meth)acrylamide, N-butyl(meth)acrylamide, and N-(meth)acryloylmorpholine, vinyl esters such as vinyl acetate, vinyl ethers such as isobutyl vinyl ether, styrene, alkyl-, hydroxy- and halostyrenes, N-vinylpyrrolidone, N-vinylcaprolactam, N-vinylacetoamide, N-vinylformamide, vinyl chloride and vinylidene chloride.

Examples of polyunsaturated compounds of relatively high molecular mass (oligomers) are polyesters, polyurethanes, polyethers and polyamides, which contain ethylenically unsaturated carboxylates.

Particularly suitable examples are esters of an ethylenically unsaturated carboxylic acid with a polyol or polyepoxide.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acids are preferred.

Suitable polyols are aromatic, in particular, aliphatic and cycloaliphatic polyols. Examples of aromatic polyols are hydroquinone, 4,4'-dihydroxydiphenyl, 2,2-bis(4-hydroxyphenyl)methane, 2,2-bis(4-hydroxyphenyl)propane, 2,2-bis (4-hydroxyphenyl)hexafluoropropane, 9,9-bis(4-hydroxyphenyl)fluorene, novolacs and resols. Examples of aliphatic and cycloaliphatic polyols are alkylenediols having preferably 2 to 12 C atoms, such as ethylene gly-col, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, triethanolamine, trimethylolethane, trimethylolpropane, pentaerythritol, pentaerythritol monooxalate, dipentaerythritol, ethers of pentaerythritol with ethylene glycol or propylene glycol, ethers of dipentaerythritol with ethylene glycol or propylene glycol, sorbitol, 2,2-bis[4-(2-hydroxyethoxy)phenyl]methane, 2,2-bis[4-(2-hydroxyethoxy)phenyl]propane and 9,9-bis[4-(2-hydroxyethoxy)phenyl]fluorene. Other suitable polyols are polymers and copolymers containing hydroxy groups in the polymer chain or in side groups, examples being homopolymers or copolymers comprising vinyl alcohol or comprising hydroxyalkyl (meth)acrylates. Further polyols which are suitable are esters and urethanes having hydroxyl end groups.

The polyols may be partially or completely esterified with one unsaturated carboxylic acid or with different unsaturated carboxylic acids, and in partial esters the free hydroxyl groups may be modified, for example etherified or esterified with other carboxylic acids.

Examples of esters based on polyols are trimethylolpropane tri(meth)acrylate, trimethylolpropane tri(acryloyloxypropyl)ether, trimethylolethane tri(meth)acrylate, ethylene glycol di(meth)acrylate, diethylene glycol di(meth)acrylate, triethylene glycol di(meth)acrylate, tetra-ethylene glycol di(meth)acrylate, tetramethylene glycol di(meth)acrylate, neopentyl glycol di(meth)acrylate, pentaerythritol di(meth) acrylate, pentaerythritol tri(meth)acrylate, pentaerythritol tetra(meth)acrylate, pentaerythritol tri(meth)acrylate monooxalate, dipentaerythritol di(meth)acrylate, dipentaerythritol tri(meth)acrylate, dipentaerythritol tetra(meth) acrylate, dipentaerythritol penta(meth)acrylate, dipentaerythritol hexa(meth)acrylate, dipentaerythritol penta (meth)acrylate mono(2-hydroxyethyl) ether, tripentaerythritol octa(meth)acrylate, 1,3-butanediol di(meth)acrylate, 1,4-butanediol diitaconate, hexanediol di(meth)acrylate, 1,4-cyclohexanediol di(meth)acrylate, sorbitol tri(meth)acrylate, sorbitol tetra(meth)acrylate, sorbitol penta(meth)acrylate, sorbitol hexa(meth)acrylate, oligoester (meth)acrylates, glycerol di(meth)acrylate and tri(meth)acrylate, di(meth)acrylates of polyethylene glycol with a molecular weight of from 200 to 1500, pentaerythritol diitaconate, dipentaerythritol trisitaconate, dipentaerythritol pentaitaconate, dipentaerythritol hexaitaconate, ethylene glycol diitaconate, propylene glycol diitaconate, 1,3-butanediol diitaconate, 1,4-butanediol diitaconate, tetramethylene glycol diitaconate, sorbitol tetraitaconate, ethylene glycol dicrotonate, tetramethylene glycol dicrotonate, pentaerythritol dicrotonate, ethylene glycol dimaleate, tiethylene glycol dimaleate, pentaerythritol dimaleate, sorbitol tetramaleate, or mixtures thereof.

Other examples are pentaerythritol and dipentaerythritol derivatives shown in the following formula (XII) and (XIII).

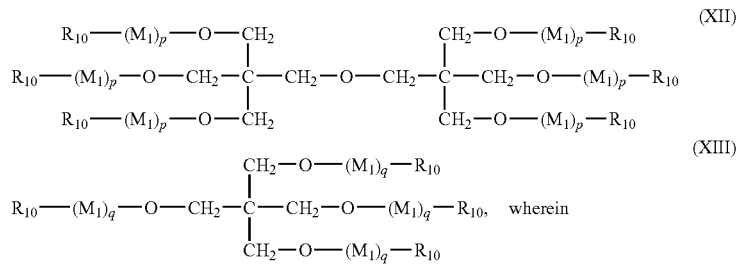

$M_1$ is —$(CH_2CH_2O)$— or —$[CH_2CH(CH_3)O]$—, $R_{10}$ is —$COCH=CH_2$ or —$COC(CH_3)=CH_2$, p is 0 to 6 (total of p: 3-24), and q is 0 to 6 (total of q: 2-16).

Examples of polyepoxides are those based on the abovementioned polyols and epichloro-hydrin. Typical examples are bis(4-glycidyloxyphenyl)methane, 2,2-bis(4-glycidyloxyphenyl)propane, 2,2-bis(4-glycidyloxyphenyl)hexafluoropropane, 9,9-bis(4-glycidyloxyphenyl)fluorene, bis[4-(2-glycidyloxyethoxy)phenyl]methane, 2,2-bis[4-(2-glycidyloxyethoxy)phenyl]propane, 2,2-bis[4-(2-glycidyloxyethoxy)phenyl]hexafluoropropane, 9,9-bis[4-(2-glycidyloxyethoxy)phenyl]fluorene, bis[4-(2-glycidyloxypropoxy)phenyl]methane, 2,2-bis[4-(2-glycidyloxypropoxy)phenyl]propane, 2,2-bis[4-(2-glycidyloxypropoxy)phenyl]hexafluoropropane, 9,9-bis[4-(2-glycidyloxypropoxy)phenyl]fluorene, and glycidyl ethers of phenol and cresol non-volacs.

Typical examples of the at least one ethylenically unsaturated compound which is based on polyepoxides include 2,2-bis[4-{(2-hydroxy-3-acryloxy)propoxy}phenyl]propane, 2,2-bis[4-{(2-hydroxy-3-acryloxy)propoxyethoxy}phenyl] propane, 9,9-bis[4-{(2-hydroxy-3-acryloxy) propoxy}phenyl]fluorene, 9,9-bis[4-{(2-hydroxy-3-acryloxy)propoxyethoxy}phenyl]fluorine, and reaction products of epoxy resins based on novolacs with (meth)acrylic acid.

Polyethers obtained from the reaction of the abovementioned polyols or polyepoxides with the unsaturated compounds with a hydroxy group such as 2-hydroxyethyl(meth) acrylate, vinyl alcohol can also be used as the at least one ethylenically unsaturated compound.

Also suitable as the at least one ethylenically unsaturated compound are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy) ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy) ethane, β-methacrylamidoethyl methacrylate and N[(β-hydroxyethoxy)ethyl]acrylamide.

Other examples are unsaturated urethanes derived from a polyisocyanate and an unsaturated compound having a hydroxy group or from a polyisocyanate, a polyol and an unsaturated compound having a hydroxy group.

Other examples are polyesters, polyamides, or polyurethanes having ethylenically unsaturated groups in the chain. Suitable unsaturated polyesters and polyamides are also derived, for example, from maleic acid and diols or diamines. Some of the maleic acid can be replaced by other dicarboxylic acids. The polyesters and polyamides may also be derived from dicarboxylic acids and ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Other suitable polymers with acrylate or methacrylate groups in the side chains are, for example, solvent soluble or alkaline soluble polyimide precursors, for example poly (amic acid ester) compounds, having photopolymerizable side groups either attached to the backbone or to the ester groups in the molecule. Such oligomers or polymers can be formulated optionally with reactive diluents, like polyfunctional (meth)acrylates in order to prepare highly sensitive polyimide precursor resists.

Further examples of the at least one ethylenically unsaturated compound include also polymers or oligomers having at least one carboxyl function and at least two ethylenically unsaturated groups within the molecular structure, such as a resin obtained by the reaction of a saturated or unsaturated polybasic acid anhydride with a product of the reaction of phenol or cresol novolac epoxy resin and an unsaturated monocarboxylic acid, for example, commercial products such as EB9696, UCB Chemicals; KAYARAD TCR1025, Nippon Kayaku Co., LTD. Examples of the polybasic acid anhydride are maleic anhydride, succinic anhydride, itaconic anhydride, phthalic anhydride, tetrahydrophthalic anhydride, hexahydrophthalic anhydride, methyltetrahydrophathalic anhydride, glutaric anhydride, glutaconic anhydride, citraconic anhydride, diglycolic anhydride, iminodiacetic anhydride, 1,1-cyclopentanediacetic anhydride, 3,3-dimethylglutaric anhydride, 3-ethyl-3-methylglutaric anhydride, 2-phenylglutaric anhydride, homophthalic anhydride, trimellitic anhydride, chlorendic anhydride, pyromellitic dianhydride, benzophenone tetracarboxylic acid dianhydride, biphenyl tetracarboxylic acid dianhydride, and biphenylether tetracarboxylic acid dianhydride.

Other examples are the products from the polycondensation reaction and/or addition reaction of the compound of formula (XIV) with one or more abovementioned polybasic acid anhydrides.

Further examples are reaction products obtained by adding an epoxy group containing unsaturated compound to a part of the carboxyl groups of a carboxylic acid group containing polymer. As the carboxylic acid containing polymer, the abovementioned binder polymers which are resulting from the reaction of an unsaturated carboxylic acid compound with one or more polymerizable compounds, for example, copolymers of (meth)acrylic acid, benzyl (meth)acrylate, styrene and 2-hydroxyethyl(meth)acrylate, copolymers of (meth) acrylic acid, styrene and α-methystyrene, copolymers of (meth)acrylic acid, N-phenylmaleimide, styrene and benzyl (meth)acrylate, copolymers of (meth)acrylic acid and styrene, copolymers of (meth)acrylic acid and benzyl(meth) acrylate, copolymers of tetrahydrofurfuryl(meth)acrylate, styrene and (meth)acrylic acid, and the like.

Examples of the unsaturated compounds having an epoxy group are given below in the formula (V-1)-(V-15);

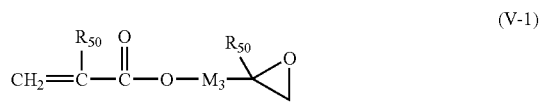
(V-1)

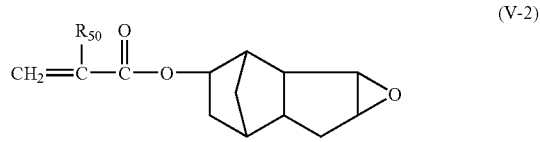
(V-2)

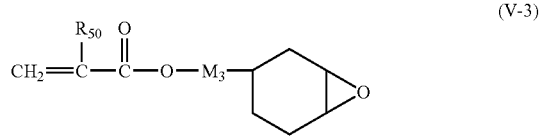
(V-3)

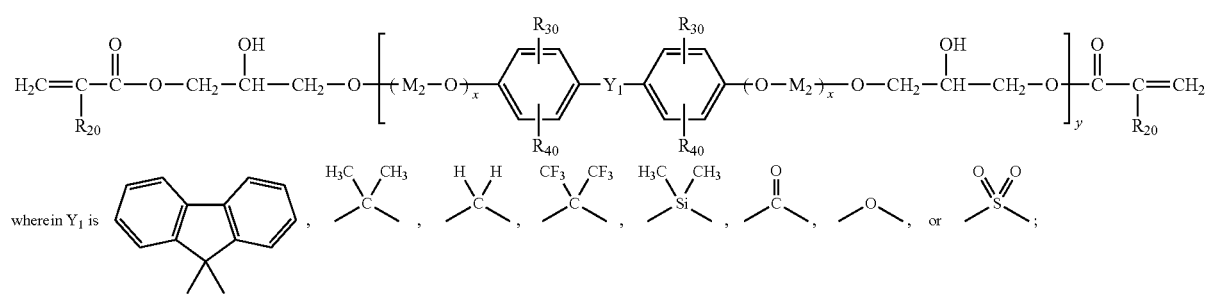

$R_{20}$ is hydrogen or methyl, $R_{30}$ and $R_{40}$ independently of each other are hydrogen, methyl, Cl, or Br, $M_2$ is substituted or unsubstituted alkylene having 1 to 10 carbon atoms, x is 0 to 5, and y is 1 to 10.

A preferred photopolymerizable composition comprises as component (a) a compound having at least two ethylenically unsaturated bonds and at least one carboxylic acid group in the molecule, in particular a reaction product obtained by adding an epoxy group containing unsaturated compound to a part of the carboxyl groups of a carboxylic acid group containing polymer or a reaction product of the compound shown below with one or more polybasic acid anhydrides. Further preferred components (a) comprise a compound of the formula XIV.

-continued

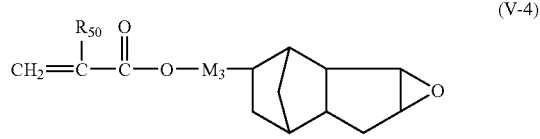
(V-4)

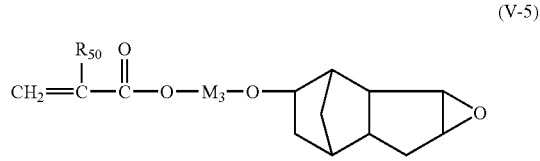
(V-5)

-continued

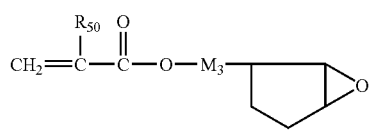
(V-6)

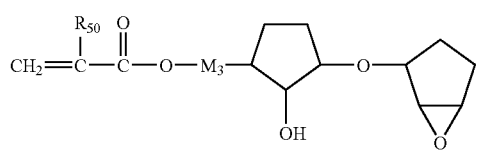
(V-7)

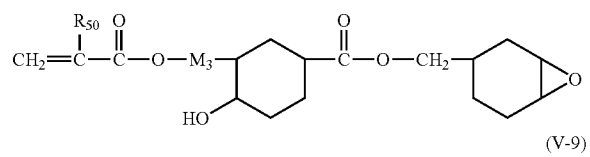
(V-8)

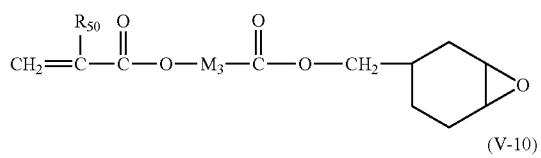
(V-9)

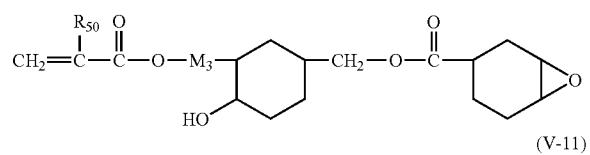
(V-10)

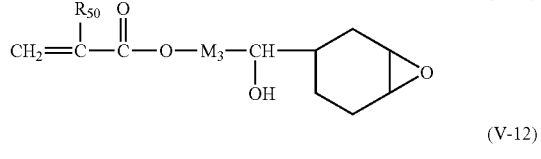
(V-11)

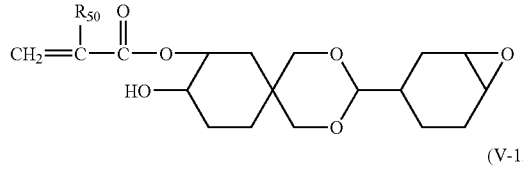
(V-12)

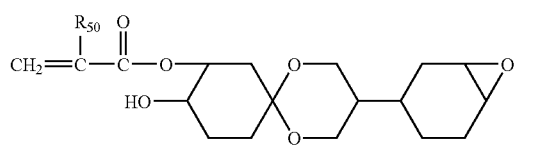
(V-13)

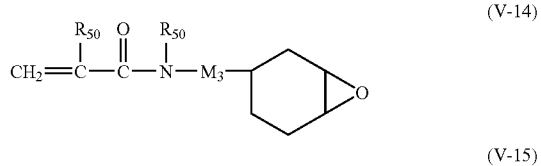
(V-14)

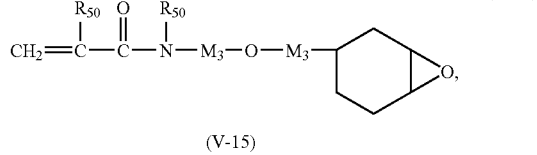
(V-15)

wherein $R_{50}$ is hydrogen or methyl group, $M_3$ is substituted or unsubstituted alkylene having 1 to 10 carbon atoms.

Among these compounds, compounds having alicyclic epoxy groups are particularly preferred, because these compounds have a high reactivity with carboxyl group containing resins, accordingly the reaction time can be shortened. These compounds further do not cause gelation in the process of reaction and make it possible to carry out the reaction stably. On the other hand, glycidyl acrylate and glycidyl methacrylate are advantageous from the viewpoint of sensitivity and heat resistance because they have a low molecular weight and can give a high conversion of esterification.

Concrete examples of the abovementioned compounds are, for example a reaction product of a copolymer of styrene, alpha-methyl styrene and acrylic acid or a copolymer of methyl methacrylate and acrylic acid with 3,4-epoxycyclohexylmethyl(meth)acrylate.

Unsaturated compounds having a hydroxy group such as 2-hydroxyethyl(meth)acrylate and glycerol mono(meth)acrylate can be used instead of the above mentioned epoxy group containing unsaturated compounds as the reactant for carboxylic acid group containing polymers.

Other examples are half esters of anhydride containing polymers, for example reaction products of a copolymer of maleic anhydride and one or more other polymerizable compounds with (meth)acrylates having an alcoholic hydroxy group such as 2-hydroxyethyl (meth)acrylate or having an epoxy group for example such as the compounds described in the formula (V-1)-(V-15).

Reaction products of polymers having alcoholic hydroxy groups such as copolymers of 2-hydroxyethyl(meth)acrylate, (meth)acrylic acid, benzy methacylate and styrene, with (meth)acrylic acid or (meth)acryl chloride can also be used as component (a).

Other examples are reaction products of a polyester with terminal unsaturated groups, which is obtained from the reaction of a dibasic acid anhydride and a compound having at least two epoxy groups followed by further reaction with an unsaturated compound, with a polybasic acid anhydride.

Further examples are resins obtained by the reaction of a saturated or unsaturated polybasic acid anhydride with a reaction product obtained by adding epoxy group containing (meth)acrylic compound to all of the carboxyl groups of a carboxylic acid containing polymer as mentioned above.

The photopolymerizable compounds can be used alone or in any desired mixtures.

In a color filter resist composition the whole amount of the monomers contained in the photopolymerizable composition is preferably 5 to 80% by weight, in particular 10 to 70% by weight based on the whole solid contents of the composition, i.e. the amount of all components without the solvent(s).

Example of suitable photoinitiators are, camphor quinone; benzophenone, benzophenone derivatives, such as 2,4,6-trimethylbenzophenone, 2-methylbenzophenone, 3-methylbenzophenone, 4-methylbenzophenone, 2-methoxycarbonylbenzophenone 4,4'-bis(chloromethyl)benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoylbenzoate, 3-methyl-4'-phenylbenzophenone, 2,4,6-trimethyl-4'-phenylbenzophenone, 4,4'-bis(dimethylamino)benzophenone, 4,4'-bis(diethylamino)benzophenone; ketal compounds, as for example benzildimethylketal (IRGACURE® 651); acetophenone, acetophenone derivatives, for example α-hydroxycycloalkyl phenyl ketones or 2-hydroxy-2-methyl-1-phenylpropanone (DAROCUR® 1173), 1-hydroxy-cyclohexyl-phenyl-ketone (IRGACURE® 184) 1-[4-(2-Hydroxyethoxy)-phenyl]-2-hydroxy-2-methyl-1-propan-1-one (IRGACURE2959); 2-Hydroxy-1-{4-[4-(2-hydroxy-2- methyl-propionyl)-benzyl]-phenyl}-2-methylpropan-1-one (IRGACURE127); 2-Hydroxy-1-{4-[4-(2-hydroxy-2-methylpropionyl)-phenoxy]-phenyl}-2-methylpropan-1-one; dialkoxyacetophenones, α-hydroxy- or α-aminoacetophenones, e.g. (4-methylthiobenzoyl)-1-methyl-1-morpholinoethane (IRGACURE® 907), (4-morpholinobenzoyl)-1-benzyl-1-dimethylaminopropane (IRGACURE® 369), (4-morpholinobenzoyl)-1-(4-methylbenzyl)-1-dimethylaminopropane (IRGACURE® 379), (4-(2-hydroxyethyl)aminobenzoyl)-1-benzyl-1-dimethylaminopropane), (3,4-dimethoxybenzoyl)-1-benzyl-1-dimethylaminopropane; 4-aroyl-1,3-dioxolanes, benzoin alkyl ethers and benzil ketals, phenylglyoxalic esters and derivatives thereof, e.g. oxo-phenyl-acetic acid 2-(2-hydroxy-ethoxy)-ethyl ester, dimeric phenylglyoxalic esters, e.g. oxo-phenyl-acetic acid 1-methyl-2-[2-(2-oxo-2-phenyl-acetoxy)-propoxy]-ethyl ester (IRGACURE® 754); further oximeesters, e.g. 1,2-octanedione 1-[4-(phenylthio)phenyl]-2-(O-benzoyloxime) (IRGACURE® OXE01), ethanone 1-[9-ethyl-6-(2-methylbenzoyl)-9H-carbazol-3-yl]-1-(O-acetyloxime) (IRGACURE® OXE02), 9H-thioxanthene-2-carboxaldehyde 9-oxo-2-(O-acetyloxime), peresters, e,g. benzophenone tetracarboxylic peresters as described for example in EP 126541, monoacyl phosphine oxides, e.g. (2,4,6-trimethylbenzoyl)diphenylphosphine oxide (DAROCUR® TPO), bisacylphosphine oxides, e.g. bis(2,6-dimethoxy-benzoyl)-(2,4,4-trimethylpentyl)phosphine oxide, bis(2,4,6-trimethylbenzoyl)-phenylphosphine oxide (IRGACURE® 819), bis(2,4,6-trimethylbenzoyl)-2,4-dipentoxyphenylphosphine oxide, trisacylphosphine oxides, halomethyltriazines, e.g. 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine, hexaarylbisimi-dazole/coinitiators systems, e.g. ortho-chlorohexaphenyl-bisimidazole combined with 2-mercaptobenzthiazole, and 4,4'-bis(diethylamino)benzophenone ferrocenium compounds, or titanocenes, e.g. bis(cyclopentadienyl)-bis(2,6-difluoro-3-pyrryl-phenyl)titanium (IRGACURE®784). Further, borate compounds can be used as coinitiators.

Where the photoinitiator systems are employed in hybrid systems, use is made, in addition to the novel free-radical hardeners, of cationic photoinitiators, of peroxide compounds, such as benzoyl peroxide (other suitable peroxides are described in U.S. Pat. No. 4,950,581 column 19, lines 17-25), of aromatic sulfonium-, phosphonium- or iodonium salts as described for example in U.S. Pat. No. 4,950,581, column 18, line 60 to column 19, line 10 or cyclopentadienyl-arene-iron(II) complex salts, for example (η⁶-iso-propylbenzene)(η⁵-cyclopentadienyl)iron(II) hexafluorophosphate, as well as oxime sulfonic acid esters, as are, for example described in EP 780729. Also pyridinium and (iso)quinolinium salts as described e.g. in EP 497531 and EP 441232 may be used in combination with the photoinitiators.

In addition to the photoinitiator the photopolymerizable compositions may include various additives. Examples of these are thermal inhibitors, which are intended to prevent premature polymerization, examples being hydroquinone, hydroquinone derivatives, p-methoxyphenol, β-naphthol or sterically hindered phenols, such as 2,6-di-tert-butyl-p-cresol. In order to increase the stability on storage in the dark it is possible, for example, to use copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, for example tetramethylammonium chloride or trimethylbenzylammonium chloride, or hydroxylamine derivatives, for example N-diethylhydroxylamine. To exclude atmospheric oxygen during the polymerization it is possible to add paraffin or similar wax-like substances which, being of inadequate solubility in the polymer, migrate to the surface in the beginning of polymerization and form a transparent surface layer which prevents the ingress of air. It is also possible to apply an oxygen-impermeable layer on top of the coating, for example poly (vinylalcohol-co-vinylacetate). Light stabilizers which can be added in a small quantity are UV absorbers, for example those of the hydroxyphenylbenzotriazole, hydroxyphenylbenzophenone, oxalamide or hydroxyphenyl-s-triazine type. These compounds can be used individually or in mixtures, with or without sterically hindered amines (HALS).

Examples of such UV absorbers and light stabilizers are 1. 2-(2'-hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydro-xyphenyl)benzotriazole, 2-(2'-hydroxy-5'-(1,1,3,3-tetramethyl butyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotrizole, 2-(2'-hydroxy-4'-octoxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)-benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethyl-hexyl-oxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-yl-phenol]; transesterification product of 2-[3'-tert-butyl-5'-(2-methoxycarbonylethyl)-2'-hydroxy-phenyl]-benzotriazole with polyethylene glycol 300; [R—CH2CH2-COO(CH2)3]2- where R=3'-tert-butyl-4'-hydroxy-5'-2H-benzotriazol-2-yl-phenyl.

2. 2-Hydroxybenzophenones, for example the 4-hydroxy-, 4-methoxy-, 4-octoxy-, 4-decyloxy-, 4-dodecyloxy-, 4-benzyloxy-, 4,2',4'-trihydroxy- and 2'-hydroxy-4,4'-dimethoxy derivative.

3. Esters of Substituted or Unsubstituted Benzoicacids, for example 4-tert-butylphenyl salicy-late, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexa-decyl 3,5-di-tert-butyl-4-hydroxybenzoate, octadecyl 3,5-di-tert-butyl-4-hydroxybenzoate, and 2-methyl-4,6-di-tert-butylphenyl 3,5-di-tert-butyl-4-hydroxybenzoate.

4. Acrylates, for example isooctyl or ethyl α-cyano-β,β-diphenyl acrylate, methyl α-carbomethoxycinnamate, butyl or methyl α-cyano-β-methyl-p-methoxycinnamate, methyl α-carboxymethoxy-p-methoxycinnamate and N-(β-carbomethoxy-β-cyanovinyl)-2-methylindoline.

5. Sterically Hindered Amines, for example bis-(2,2,6,6-tetramethylpiperidyl) sebacate, bis-(2,2,6,6-tetramethylpiperidyl) succinate, bis-(1,2,2,6,6-pentamethylpiperidyl) sebacate, bis(1,2,2,6,6-pentamethylpiperidyl) n-butyl-3,5-di-tert-butyl-4-hydroxybenzylmalonate, condensation product of 1-hydroxyethyl-2,2,6,6-tetramethyl-4-hydroxypiperidine and succinic acid, condensation product of N,N'-bis-(2,2,6,6-tetramethyl-4-piperidyl)hexamethylenediamine and 4-tert-octylamino-2,6-dichloro-1,3,5-s-triazine, tris-(2,2,6,6-tetramethyl-4-piperidyl) nitrilotriacetate, tetrakis-(2,2,6,6-tetramethyl-4-piperidyl)-1,2,3,4-butane tetraoate, 1,1'-(1,2-ethandiyl)bis(3,3,5,5-tetramethylpiperazinone), 4-benzoyl-2,2,6,6-tetramethylpiperidine, 4-stearyloxy-2,2,6,6-tetramethylpiperidine, bis-(1,2,2,6,6-pentamethylpiperidyl) 2-n-butyl-2-(2-hydroxy-3,5-di-tert-butylbenzyl) malonate, 3-n-octyl-7,7,9,9-tetramethyl-1,3,8-triazaspiro-[4.5]decane-2,4-dione, bis-(1-octyloxy-2,2,6,6-tetramethyl piperidyl) sebacate, bis-(1-octyloxy-2,2,6,6-tetramethylpiperidyl) succinate, condensation product of N,N'-bis-(2,2,6,6-tetra-methyl-4-piperidyl)hexamethylenediamine and 4-morpholino-2,6-dichloro-1,3,5-triazine, condensation product of 2-chloro-4,6-di-(4-n-butylamino-2,2,6,6-tetramethylpiperidyl)-1,3,5-triazine and 1,2-bis-(3-aminopropyl-amino)ethane, condensation product of 2-chloro-4,6-di-(4-n-butylamino-1,2,2,6,6-pentamethylpiperidyl)-1,3,5-triazine and 1,2-bis-(3-aminopropylamino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione and 3-dodecyl-1-(1,2,2,6,6-penta-methyl-4-piperidyl)-pyrrolidine-2,5-dione.

6. Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'di-tert-butyloxanilide, 2-ethoxy-2'-ethyl-oxanilide, N,N'-bis-(3-dimethylaminopropyl)oxalamide, 2-ethoxy-5-tert-butyl-2'-ethyloxanilide and its mixture with 2-ethoxy-2'-ethyl-5,4'-di-tert-butyloxanilide, mixtures of o- and p-methoxy- and of o- and p-ethoxy-disubstituted oxanilides.

7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxy-phenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-dodecyl/tridecyl-oxy-(2-hydroxypropyl)oxy-2-hydroxy-phenyl]-4,6-bis(2,4-dimethylphenyl)-1,3,5-triazine.

8. Phosphites and Phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris-(2,4-di-tert-butylphenyl) phosphite, diisodecyl pentaerythrityl diphosphite, bis-(2,4-di-tert-butylphenyl) pentaerythrityl diphosphite, bis-(2,6-di-tert-butyl-4-methylphenyl) pentaerythrityl diphosphite, bis-isodecyloxy pentaerythrityl diphosphite, bis-(2,4-di-tert-butyl-6-methylphenyl) pentaerythrityl diphosphite, bis-(2,4,6-tri-tert-butylphenyl) pentaerythrityl diphosphite, tristearyl sorbityl triphosphite, tetrakis-(2,4-di-tert-butylphenyl)-4,4'-biphenylene diphosphonite, 6-isooctyloxy-2,4,8,10-tetratert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis-(2,4-di-tert-butyl-6-methylphenyl) methyl phosphite and bis(2,4-di-tert-butyl-6-methylphenyl) ethyl phosphite.

To accelerate the photopolymerization it is possible to further add amines, for example triethanolamine, N-methyidiethanolamine, ethyl-p-dimethylaminobenzoate, 2-(dimethylamino)ethyl benzoate, 2-ethylhexyl-p-dimethylaminobenzoate, octyl-para-N,N-dimethylaminobenzoate, N-(2-hydroxyethyl)-N-methyl-para-toluidine or Michler's ketone. The action of the amines can be intensified by the addition of aromatic ketones of the benzophenone type. Examples of amines which can be used as oxygen scavengers are substituted N,N-dialkylanilines, as are described in EP 339841. Other accelerators, coinitiators and autoxidizers are thiols, thioethers, disulfides, phosphonium salts, phosphine oxides or phosphines, as described, for example, in EP 438123, in GB 2180358 and in JP Kokai Hei 6-68309.

It is further possible to add chain transfer agents which are customary in the art to the colorant compositions according to the invention. Examples are mercaptans, amines and benzothiazol.

Photopolymerization can also be accelerated by adding further photosensitizers or coinitiators which shift or broaden the spectral sensitivity. These are, in particular, aromatic compounds, for example benzophenone and derivatives thereof, thioxanthone and derivatives thereof, anthraquinone and derivatives thereof, coumarin and phenothiazine and derivatives thereof, and also 3-(aroylmethylene)thiazolines, rhodanine, camphorquinone, but also eosine, rhodamine, erythrosine, xanthene, thioxanthene, acridine, e.g. 9-phenylacridine, 1,7-bis(9-acridinyl)heptane, 1,5-bis(9-acridinyl) pentane, cyanine and merocyanine dyes.

Specific examples of such compounds are

1. Thioxanthones

Thioxanthone, 2-isopropylthioxanthone, 2-chlorothioxanthone, 1-chloro-4-propoxythioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]-thioxanthone, 1,3-dimethyl-2-hydroxy-9H-thioxanthen-9-one 2-ethylhexylether, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-carboxylic acid polyethyleneglycol ester, 2-hydroxy-3-(3,4-dimethyl-9-oxo-9H-thioxanthon-2-yloxy)-N,N,N-trimethyl-1-propanaminium chloride;

2. Benzophenones benzophenone, 4-phenyl benzophenone, 4-methoxy benzophenone, 4,4'-dimethoxy benzophenone, 4,4'-dimethyl benzophenone, 4,4'-dichlorobenzophenone 4,4'-bis(dimethylamino)benzophenone, 4,4'-bis(diethylamino)benzophenone, 4,4'-bis(methylethylamino)benzophenone, 4,4'-bis(p-isopropylphenoxy)benzophenone, 4-methyl benzophenone, 2,4,6-trimethylbenzophenone, 4-(4-methylthiophenyl)-benzophenone, 3,3'-dimethyl-4-methoxy benzophenone, methyl-2-benzoylbenzoate, 4-(2-hydroxyethylthio)-benzophenone, 4-(4-tolylthio)benzophenone, 1-[4-(4-benzoyl-phenylsulfanyl)-phenyl]-2-methyl-2-(toluene-4-sulfonyl)-propan-1-one, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)-benzophenone, 4-benzoyl-N, N-dimethyl-N-[2-(1-oxo-2-propenyl)oxy]ethyl-benzenemethanaminium chloride;

3. Coumarins

Coumarin 1, Coumarin 2, Coumarin 6, Coumarin 7, Coumarin 30, Coumarin 102, Coumarin 106, Coumarin 138, Coumarin 152, Coumarin 153, Coumarin 307, Coumarin 314, Coumarin 314T, Coumarin 334, Coumarin 337, Coumarin 500, 3-benzoyl coumarin, 3-benzoyl-7-methoxycoumarin, 3-benzoyl-5,7-dimethoxycoumarin, 3-benzoyl-5,7-dipropoxycoumarin, 3-benzoyl-6,8-dichlorocoumarin, 3-benzoyl-6-chloro-coumarin, 3,3'-carbonyl-bis[5,7-di(propoxy)-coumarin], 3,3'-carbonyl-bis(7-methoxycoumarin), 3,3'-carbonyl-bis(7-diethylamino-coumarin), 3-isobutyroyl-coumarin, 3-benzoyl-5,7-dimethoxy-coumarin, 3-benzoyl-5,7-diethoxy-coumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-diethoxy-3-(1-naphthoyl)-coumarin, 3-benzoylbenzo[f]coumarin, 7-diethylamino-3-thienoylcoumarin, 3-(4-cyanobenzoyl)-5,7-dimethoxycoumarin, 3-(4-cyanobenzoyl)-5,7-dipropoxycoumarin, 7-dimethylamino-3-phenylcoumarin, 7-diethylamino-3-phenylcoumarin, the coumarin derivatives disclosed in JP 09-179299-A and JP 09-325209-A, for example 7-[{4-chloro-6-(diethylamino)-S-triazine-2-yl}amino]-3-phenylcoumarin;

4. 3-(aroylmethylene)-thiazolines 3-methyl-2-benzoylmethylene-β-naphthothiazoline, 3-methyl-2-benzoylmethylene-benzothiazoline, 3-ethyl-2-propionylmethylene-β-naphthothiazoline;

5. Rhodamines 4-dimethylaminobenzalrhodamine, 4-diethylaminobenzalrhodamine, 3-ethyl-5-(3-octyl-2-benzothiazolinylidene)-rhodamine, the rhodanine derivatives, formulae [1], [2], [7], disclosed in JP 08-305019A;

6. Other Compounds acetophenone, 3-methoxyacetophenone, 4-phenylacetophenone, benzil, 4,4'-bis(dimethylamino)benzil, 2-acetylnaphthalene, 2-naphthaldehyde, dansyl acid derivatives, 9,10-anthraquinone, anthracene, pyrene, aminopyrene, perylene, phenanthrene, phenanthrenequinone, 9-fluorenone, dibenzosuberone, curcumin, xanthone, thiomichler's ketone, α-(4-dimethylaminobenzylidene) ketones, e.g. 2,5-bis(4-diethylaminobenzylidene)cyclopentanone, 2-(4-dimethylaminobenzylidene)-indan-1-one, 3-(4-dimethylamino-phenyl)-1-indan-5-yl-propenone, 3-phenylthiophthalimide, N-methyl-3,5-di(ethylthio)-phthalimide, N-methyl-3,5-di(ethylthio)-phthalimide, phenothiazine, methylphenothiazine, amines, e.g. N-phenylglycine, ethyl 4-dimethylaminobenzoate, butoxyethyl 4-dimethylaminobenzoate, 4-dimethylaminoacetophenone, triethanolamine, methyldiethanolamine, dimethylaminoethanol, 2-(dimethylamino)ethyl benzoate, poly(propylenegylcol)-4-(dimethylamino) benzoate.

A photopolymerizable composition, comprising as further additive a photosensitizer compound selected from the group consisting of benzophenone and its derivatives, thioxanthone and its derivatives, anthraquinone and its derivatives, or coumarin derivatives is preferred.

The curing process can be assisted by adding photosensitizers, in particular, in compositions which are pigmented (for example with titanium dioxide), and also by adding a component which under thermal conditions forms free radicals, for example an azo compound such as 2,2'-azobis(4-methoxy-2,4-dimethylvaleronitrile), a triazene, diazo sulfide, pentazadiene or a peroxy compound, for instance a hydroperoxide or peroxycarbonate, for example t-butyl hydroperoxide, as described for example in EP 245639.

The colorant compositions according to the invention may comprise as further additive a photoreducible dye, e.g., xanthene-, benzoxanthene-, benzothioxanthene, thiazine-, pyronine-, porphyrine- or acridine dyes, and/or trihalogenmethyl compounds which can be cleaved by irradiation.

Further additives known in the art may be added, for example flow improvers, adhesion promoters, such as vinyltrimethoxysilane, vinyltriethoxysilane vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltrimethoxysilane. Surfactants, optical brighteners, pigments, dyes, wetting agents, levelling assistants, dispersants, aggregation preventers, antioxidants or fillers are further examples for suitable additives.

In order to cure thick and pigmented coatings it is appropriate to add glass microspheres or pulverized glass fibres, as described for example in U.S. Pat. No. 5,013,768.

The choice of additive(s) is made depending on the field of application and on properties required for this field. The additives described above are customary in the art and accordingly are added in amounts which are usual in the respective application.

Binders as well can be added to the colorant compositions of the present invention. This is particularly expedient when the photopolymerizable compounds are liquid or viscous substances. The quantity of binder may, for example, be 2-98%, preferably 5-95% and especially 20-90%, by weight relative to the overall solids content. The choice of binder is made depending on the field of application and on properties required for this field, such as the capacity for development in aqueous and organic solvent systems, adhesion to substrates and sensitivity to oxygen.

Examples of suitable binders are polymers having a molecular weight of about 2,000 to 2,000,000, preferably 5,000 to 1,000,000. Examples of alkali developable binders are acrylic polymer having carboxylic acid function as a pendant group, such as conventionally known copolymers obtained by copolymerizing an ethylenic unsaturated carboxylic acid such as (meth)acrylic acid, 2-carboxyethyl (meth)acrylic acid, 2-carboxypropyl(meth)acrylic acid itaconic acid, crotonic acid, maleic acid, fumaric acid and ω-carboxypolycaprolactone mono(meth)acrylate, with one or more monomers selected from esters of (meth)acrylic acid, such as methyl(meth)acrylate, ethyl(meth)acrylate, propyl(meth)acrylate, butyl (meth)acrylate, benzyl(meth)acrylate, 2-ethylhexyl(meth)acrylate, hydroxyethyl (meth)acrylate, hydroxypropyl(meth)acrylate, glycerol mono(meth)acrylate, tricyclo[$5.2.1.0^{2,6}$]decan-8-yl(meth)acrylate, glycidyl(meth) acrylate, 2-methylglycidyl (meth)acrylate, 3,4-epoxybutyl (meth)acrylate, 6,7-epoxyheptyl(meth)acrylate; vinyl aromatic compounds, such as styrene, α-methylstyrene, vinyltoluene, p-chlorostyrene, vinylbenzyl glycidyl ether; amide type unsaturated compounds, (meth)acrylamide diacetone acrylamide, N-methylolacrylamide, N-butoxymethacrylamide; and polyolefin type compounds, such as butadiene, isoprene, chloroprene and the like; methacrylonitrile, methyl isopropenyl ketone, mono-2-[(meth)acryloyloxy]ethyl succinate, N-phenylmaleimide, maleic anhydride, vinyl acetate, vinyl propionate, vinyl pivalate, polystyrene macromonomer, or polymethyl (meth)acrylate macromonomer. Examples of copolymers are copolymers of acrylates and methacrylates with acrylic acid or methacrylic acid and with styrene or substituted styrene, phenolic resins, for example novolak, (poly)hydroxystyrene, and copolymers of hydroxystyrene with alkyl acrylates, acrylic acid and/or methacrylic acid. Preferable examples of co-polymers are copolymers of methyl methacrylate/methacrylic acid, copolymers of benzyl methacrylate/methacrylic acid, copolymers of methyl methacrylate/ethyl acrylate/methacrylic acid, copolymers of benzyl methacrylate/methacrylic acid/styrene, copolymers of benzyl methacrylate/methacrylic acid/hydroxyethyl methacrylate, copolymers of methyl methacrylate/butyl methacrylate/methacrylic acid/ styrene, copolymers of methyl methacrylate/benzyl methacrylate/methacrylic acid/hydroxyphenyl methacrylate. Examples of solvent developable binder polymers are poly (alkyl methacrylates), poly(alkyl acrylates), poly(benzylmethacrylate-co-hydroxyethylmethacrylate-co-methacrylic acid), poly(benzylmethacrylate-co-methacrylic acid); cellulose esters and cellulose ethers, such as cellulose acetate, cellulose acetobutyrate, methylcellulose, ethylcellulose; polyvinylbutyral, polyvinylformal, cyclized rubber, polyethers such as polyethylene oxide, polypropylene oxide and polytetrahydrofuran; polystyrene, polycarbonate, polyurethane, chlorinated polyolefins, polyvinyl chloride, vinyl chloride/vinylidene copolymers, copolymers of vinylidene chloride with acrylonitrile, methyl methacrylate and vinyl acetate, polyvinyl acetate, copoly(ethylene/vinyl acetate), polymers such as polycaprolactam and poly(hexamethylene adipamide), and polyesters such as poly(ethylene glycol terephtalate) and poly(hexamethylene glycol succinate) and polyimide binder resins.

The polyimide binder resin in the present invention can either be a solvent soluble polyimide or a polyimide precursor, for example, a poly(amic acid).

Preferred is a photopolymerizable composition, comprising as binder polymer a copolymer of methacrylate and methacrylic acid.

Further suitable polymeric binder components are described for example in JP 10-171119-A, in particular for use in color filters.

Further, in the color filter the total solid component of each color may contain an ionic impurity scavenger, e.g. an organic compound having an epoxy group. The concentration of the ionic impurity scavenger in the total solid component generally is in the range from 0.1% by weight to 10% by weight.

Examples of color filters, especially with respect to the above-described combinations of pigments and ionic impurity scavenger are given in EP 320264.

The compositions according to this invention can comprise additionally a crosslinking agent which is activated by an acid, for example as described in JP 10/221843-A, and a compound which generates acid thermally or by actinic radiation and which activates a crosslinking reaction.

The compositions according to this invention can also comprise latent pigments which are transformed into finely dispersed pigments during the heat treatment of the latent pigment containing photosensitive pattern or coating. The heat treatment can be performed after exposure or after development of the latent pigment-containing photoimageable layer. Such latent pigments are soluble pigment precursors which can be transformed into insoluble pigments by means of chemical, thermal, photolytic or radiation induced methods as described, for example, in U.S. Pat. No. 5,879,855. This transformation of such latent pigments can be enhanced by adding a compound which generates acid at actinic exposure or by adding an acidic compound to the composition. Therefore, a color filter resist can also be prepared, which comprises a latent pigment in a composition according to this invention.

Examples for color filter resists, the composition of such resists and the processing conditions are given by T. Kudo et al., Jpn. J. Appl. Phys. Vol. 37 (1998) 3594; T. Kudo et al., J. Photopolym. Sci. Technol. Vol 9 (1996) 109; K. Kobayashi, Solid State Technol. Nov. 1992, p. S15-S18; U.S. Pat. No. 5,368,976; U.S. Pat. No. 5,800,952; U.S. Pat. No. 5,882,843; U.S. Pat. No. 5,879,855; U.S. Pat. No. 5,866,298; U.S. Pat. No. 5,863,678; JP 06-230212-A; EP 320264; JP 09-269410-A; JP 10-221843-A; JP 01-090516-A; JP 10-171119-A, U.S. Pat. No. 5,821,016, U.S. Pat. No. 5,847,015, U.S. Pat. No. 5,882,843, U.S. Pat. No. 5,719,008, EP 881541, or EP 902327.

It is understood by a person skilled in the art that the use of the colorant composition of the present invention is not limited to the specific binder resins, main colorants, photoinitiators, crosslinkers and formulations of the color filter resist examples given hereinbefore but can be used in conjunction with any polymerizable component in combination with a dye or color pigment or latent pigment to form a photosensitive color filter ink or color filter resist.

In another embodiment, the present invention also relates to the use of the aforementioned (photo-)polymerizable mixtures in a manufacturing process for making of color filters.

It is well known in the art that a primary particle size of pigments is preferably smaller than the wavelength of transparent region of the color filters in order not to lose transparency due to scattering of light. The pigments of formula (I) have a primary particle size of less than 500 nm, preferably less than 300 nm, more preferably less than 100 nm, and most preferably less than 80 nm. The same applies to the particle size distribution of the pigments of the main colorant.

Micronisation techniques in obtaining such small particles have been known in the industry, for example, various milling method with/without inorganic salt such as dry milling, wet milling, roll milling, ball milling, beads milling, sand milling, Henschel milling, pin milling, dispersion milling and salt kneading. Fine particles of the pigments of formula (I) can be obtained directly by controlling the synthesis conditions, e.g. temperature and pH control of the deprotonation conditions. All these techniques are applicable in obtaining fine particles of the pigments of formula (I).

Preferably, fine particles of the pigments of formula (I) are obtained (i) by controlling the deprotection condition to give fine particles, or (ii) salt kneading of crude pigment.

It is preferred to apply surface treatment to the pigments of formula (I) in order to make the pigment easy to disperse and to stabilize the resultant pigment dispersion. The surface treatment reagents are, for example, surfactants, polymeric dispersants, general texture improving agents, pigment derivatives and mixtures thereof. It is especially preferred when the colorant composition according to the invention comprises at least one polymeric dispersant and/or at least pigment derivative.

Polymeric dispersants act via a steric stabilization mechanism on the basis of its two-component structure which combines the following two very different requirements: (1) it is capable of being strongly adsorbed into the pigment surface and thereby possess specific anchoring groups and (2) it contains polymeric chains that give steric stabilization in the required solvent or resin solution system.

Polymeric dispersants differentiate themselves from the other types of dispersing agents through considerably higher molecular weights. Because of its structural features, a polymeric dispersant is bound to numerous sites at the same time, forming durable adsorption layers upon many pigment particles. Optimal steric stabilization is achieved when the polymer chains are well solvated and properly unfurled, therefore they must be highly compatible with the surrounding resin solution. If this compatibility is obstructed, the polymer chains collapse causing the steric hindrance and the resulting stabilization to be lost.

Suitable polymeric dispersants improve pigment dispersion and reduce interparticulate attraction within that dispersion. The improved dispersion means a small average particle size (or particle size reduction achieved in a shorter milling time) with a narrower particle size distribution. Smaller particles are generally more prone to re-agglomeration or flocculation; however, because of the reduction in inter-particulate attraction, this is not the case with the dispersants according to the instant invention. Dispersions are significantly more stable to flocculation and agglomeration than those produced by conventional means.

As already noted above, suitable polymeric dispersants possess a two-component structure comprising a polymeric chain and an anchoring group. The particular combination of these leads to their effectiveness.

The nature of the polymeric chain is critical to the performance of the dispersants. If the chains are not sufficiently solvated, they will collapse onto the pigment surfaces allowing the particles to aggregate or flocculate. To meet the need for good compatibility) several different polymer chain types are used in the dispersants mentioned below, effectively covering the variety of solvents encountered.

The molecular weight of the dispersants is sufficient to provide polymer chains of optimum length to overcome van der Waals forces of attraction between pigment particles. If the chains are too short, they will not provide a sufficiently thick barrier to prevent flocculation, which in turn leads to increased viscosity and a loss of tinting properties. There is generally an optimum chain length over and above which the effectiveness of the stabilising material ceases to increase. Indeed, in some cases, molecules with longer than optimum chains can be less effective. Ideally) the chains should be free to move in the dispersing medium. To achieve this, chains with anchor groups at only one end are the most effective in providing steric stabilisation.

With regard to the anchor groups, it does not matter whether the polymer chains containing single chains or up to many hundreds of chains. The essential requirement is that the chains are successfully anchored to the pigment surface and that the particle surfaces are covered with sufficient density of chains to ensure minimum particle-particle interaction.

Because the nature of pigment surfaces differ, depending on their chemical type, many different chemical groups have been proposed as anchor groups for hyperdispersants, and the dispersants according to the invention contain several different types of anchor groups. With particularly difficult non-polar pigments, a successful anchoring approach is the use of pigment derivatives. Pigment derivatives have a strong affinity for certain pigment types and furnish the pigment surface with anchoring sites for conventional polymeric dispersants.

Suitable surfactants include anionic surfactants such as alkylbenzen- or alkylnahthalene-sulfonates, alkylsulfosuccinates or naphthalene formaldehyde sulfonates; cationic surfactants including, for example, quaternary salts such as benzyl tributyl ammonium chloride; or nonionic or amphoteric surfactants such as polyoxyethylene surfactants and alkyl- or amidopropyl betaines, respectively.

Illustrative examples of the surfactant include polyoxyethylene alkyl ethers such as polyoxyethylene lauryl ether, polyoxyethylene stearyl ether and polyoxyethylene oleyl ether; polyoxyethylene alkylphenyl ethers such as polyoxyethylene octylphenyl ether and polyoxyethylene nonylphenyl ether; polyethylene glycol diesters such as polyethylene glycol dilaurate and polyethylene glycol distearate; sorbitan fatty acid esters; fatty acid modified polyesters; tertiary amine modified polyurethanes; polyethyleneimines; those available under the trade names of KP (a product of Shin-Etsu Chemical Co., Ltd), Polyflow (a product of KYOEISHA CHEMICAL Co., Ltd), F-Top (a product of Tochem Products Co., Ltd), MEGAFAC (a product of Dainippon Ink & Chemicals, Inc.), Fluorad (a product of Sumitomo 3M Ltd), Asahi Guard and Surflon (products of Asahi Glass Co., Ltd); and the like.

These surfactants may be used alone or in admixture of two or more.

The surfactant is generally used in an amount of 50 parts or less by weight, preferably 0 to 30 parts by weight, based on 100 parts by weight of the colorant composition.

Suitable polymeric dispersants are, for example, BYK's Disperbyk® 101, 115, 130, 140, 160, 161, 162, 163, 164, 166, 168, 169, 170, 171, 180, 182, 2000, 2001, 2050, 2090, 2091, 2095, 2096, 2150, EFKA Additives' EFKA® 4008, 4009, 4010, 4015, 4046, 4047, 4050, 4055, 4060, 4080, 4300, 4330, 4400, 4401, 4402, 4403, 4406, 4500, 4510, 4520, 4530, 4540, 4550, 4560, Ajinomoto Fine Techno's PB®711, 821, 822, 823, 824, 827, Lubrizol's Solsperse® 1320, 13940, 17000, 20000, 21000, 24000, 26000, 27000, 28000, 31845, 32500, 32550, 32600, 33500, 34750, 36000, 36600, 37500, 39000, 41090, 44000, 53095 and combinations thereof.

It is preferred to use EFKA® 4046, 4047, 4060, 4300, 4330, Disperbyk® 161, 162, 163, 164, 165, 166, 168, 169, 170, 2000, 2001, 2050, 2090, 2091, 2095, 2096, 2105, 2150, PB®711, 821, 822, 823, 824, 827, Solsperse® 24000, 31845, 32500, 32550, 32600, 33500, 34750, 36000, 36600, 37500, 39000, 41090, 44000, 53095 and combinations thereof as dispersant.

Suitable texture improving agents are, for example, fatty acids such as stearic acid or behenic acid, and fatty amines such as laurylamine and stearylamine. In addition, fatty alcohles or ethoxylated fatty alcohles polyols such as aliphatic 1,2-diols or epoxidized soy bean oil, waxes, resin acids and resin acid salts may be used for this purpose.

Suitable pigment derivatives are, for example, copper phthalocyanine derivatives such as EFKA Additives' EFKA 6745, Lubrizol's Solsperse 5000, 12000, BYK's Synergist 2100 and azo derivatives such as EFKA 6750, Solsperse 22000 and Synergist 2105. The pyrimido[5,4-g]pteridine derivatives of formula (I) including their salt are also useful for the surface treatment.

These surface treatment reagents can be preferably applied to the above-mentioned micronisation process for effective treatment.

Another embodiment of the present invention relates to a color filter comprising the inventive colorant composition described above. Yet another embodiment relates to the use of the polymerizable mixture described above for the manufacture of color filters. Preferably, the resultant color filter is a green color filter having a x value smaller than 0.4 and a y value larger than 0.4 in CIE 1931 x, y chromaticity diagram; or a red color filter having a x value larger than 0.4 and a y value smaller than 0.45 in CIE 1931 x, y chromaticity diagram.

Color filters according to the present invention are generally prepared by providing red, green and blue (RGB) color elements and, optionally a black matrix, all comprising a photosensitive resin and a pigment on a transparent substrate and providing a transparent electrode either on the surface of the substrate or on the surface of the color filter layer, wherein said photosensitive resin comprises a polyfunctional acrylate monomer, an organic polymer binder and a pigment of formula (I) as described above. The monomer and binder components, as well as suitable pigments are as described above. In the manufacture of color filters the transparent electrode layer can either be applied on the surface of the transparent substrate or can be provided on the surface of the red, green and blue picture elements and the black matrix. The transparent substrate is for example a glass substrate, which can additionally have an electrode layer on its surface.

It is preferred to apply a black matrix between the color areas of different color in order to improve the contrast of a color filter.

Instead of forming a black matrix using a photosensitive composition and patterning the black photosensitive composition photolithographically by patternwise exposure (i.e. through a suitable mask) to form the black pattern separating the red green and blue colored areas on the transparent substrate it is alternatively possible to use an inorganic black matrix. Such inorganic black matrix can be formed from deposited (i.e. sputtered) metal (i.e. chromium) film on the transparent substrate by a suitable imaging process, for example utilizing photolithographic patterning by means of an etch resist, etching the inorganic layer in the areas not protected by the etch resist and then removing the remaining etch resist.

There are different methods known how and at which step in the color filter manufacturing process the black matrix can be applied. It can either be applied directly on the transparent substrate prior to formation of the red, green and blue (RGB) color filter as already mentioned above, or it can be applied after the RGB color filter is formed on the substrate.

In a different embodiment of a color filter for a liquid crystal display, according to U.S. Pat. No. 5,626,796, the black matrix can also be applied on the substrate opposite to the RGB color filter element-carrying substrate, which is separated from the former by a liquid crystal layer.

If the transparent electrode layer is deposited after applying the RGB color filter elements and—optionally—the black matrix, an additional overcoat film as a protective layer can be applied on the color filter layer prior to deposition of the electrode layer, for example, as described in U.S. Pat. No. 5,650,263.

The inventive colorant compositions can be used for generating color pixels, for the manufacture of a color filter, regardless of the above-described differences in processing, regardless, of additional layers, which can be applied and regardless of differences in the design of the color filter. The use of a composition according to the present invention to form colored elements shall not be regarded as limited by different designs and manufacturing processes of such color filters.

The instant colour filter is particularly suitable for use together with light sources such as known from cathode ray (CRT) or preferably neon tubes but hitherto not used in liquid crystal displays (LCD). The results are excellent, with greatly increased light transmittance for red light as well as outstanding colorant light stability. It is possible to get a high color gamut, especially enabling to match the NTSC standard with excellent transparency and transmittance.

Hence, the invention also pertains to a liquid crystal display comprising a color filter as defined above and a luminescent backlight source emitting green or red light, from 90 to 100 energy-%.

Suitable light sources are known per se from the different fields of cathode ray or neon tubes, for example as P1 (see Mori, Kakitani, Miyake, Yamaguchi, Okayama University of Science, Japan, Okayama Rika Daigaku Kiyo A [1994], 30A, 115-120) with a maximum visible luminescence intensity around 530 nm. Suitable light sources may in particular comprise $Zn_2SiO_4$:Mn as luminescence source, which might be powered for example by UV light or by bombardment with electrons. However, the skilled artisan will obviously also try light sources having similar or better performance. In contrast, luminescent light sources hitherto used in liquid crystal displays (for example such based on La, Ce, Tb, Yb, Eu, Ho and/or Dy, like F10) have a very narrow maximum emission at a wavelength around 545 nm, with undesired narrow side emissions at 485 and 580 nm. Generally, the instant green light source will be combined with other light sources, such as each a blue and a red light source, in order the whole combination to emit white light. The prior art liquid crystal display technology and light sources used therein is well-known from many books, publications and patents; to cite just few examples see U.S. Pat. No. 6,280,890 or the prior art documents discussed above, all contents of which are incorporated in the instant application by reference, or also Colour filters for LCD's, Displays 14(2), 115-124 [1993].

The present invention further relates to the use of the color filters described above for a display and/or image sensor application. The display application is preferably a plasma display, organic/inorganic electroluminescent display, field emission display or liquid crystal display. The image sensor application is preferably a charge coupled device or a CMOS sensor.

The following examples further describe preferred embodiments of the present invention but are not intended to limit the scope of the invention. In the examples, all parts are by weight unless otherwise indicated.

EXAMPLE 1

Synthesis of pyrimido[5,4-g]pteridine Derivatives

Pyrimido[5,4-g]pteridine derivatives are synthesised according to WO98/18866, WO99/55707, WO00/31079 and WO01/29040.

For example, 2,4,6,8-tetraaminopyrimido[5,4-g]pteridine is synthesised according to Example 3 of WO01/29040 wherein the reaction is carried out in water in the presence of p-toluenesulfonic acid to give a salt and then deprotonated with base.

EXAMPLE 2

Preparation of Poly(benzylmethacrylate-co-methacrylic Acid)

24 g of benzylmethacrylate, 6 g of methacrylic acid and 0.525 g of azobisisobutyronitrile (AIBN) are dissolved in 90 ml of propylene glycol 1-monomethyl ether 2-acetate (PG-MEA). The resulting reaction mixture is placed in a preheated oil bath at 80° C. After stirring for 5 hours at 80° C. under nitrogen, the resulting viscous solution is cooled to room temperature and used without further purification. The solid content is 25% and benzylmethacrylate:methacrylic acid ratio is 80:20 by weight.

EXAMPLE 3

Preparation of Dispersion Films for Color Filter

The following substances are introduced into a 37 ml screw bottle;

| | |
|---|---|
| 1.0 g | Pigments |
| 10.5 g | Propylene glycol 1-monomethyl ether 2-acetate |
| | Dispersant (amount is mentioned in the below tables) |
| 3.7 g | Poly(benzylmethacrylate-co-methacrylic acid) |
| | (25 wt % in PGMEA) above mentioned |
| 50.0 g | 0.5 mm zircon beads |

Pigments Used for the Examples:

TAPP: 2,4,6,8-tetraaminopyrimido[5,4-g]pteridine

C.I. Pigment Green 36: Lionol Green 6YK, TOYO INK MFG Co. Ltd.

C.I. Pigment Yellow 138: PALIOTOL YELLOW K 0961 HD, BASF

C.I. Pigment Yellow 150: CROMOPHTAL YELLOW LA, Ciba Specialty Chemicals

Dispersants Used for the Examples:

EFKA 4330, EFKA 4047: EFKA Additives

DB 161, DB 162, DB 163, DB 168: Disperbyke Additives

SS 24000, SS 32500, SS 37500: Solsperse Additives

The bottle is sealed with an inner cup then applied to a paint conditioner for 3 hours to give a dispersion.

The dispersion thus obtained is cast onto a glass substrate by means of a spin coating, wherein a layer thickness is adjusted to give a film having a desired color points (by standard C light, observation 2 degree) by controlling rotation speed, then dried at 60° C. for 1 hour. Optical properties of the dispersion films thus obtained are measured by use of a spectrophotometer (UV-2500PC, Shimadzu) and color points (C.I.E. 1931 x, y chromaticity diagram) are calculated using standard C light.

Layer thicknesses of the dispersion films are measured by use of a stylus surface profiler (Dektak 6M, ULVAC Inc.).

TABLE 1

Optical properties of green dispersion films
Pigment ratio and layer thickness of the samples are adjusted to give x = 0.300, y = 0.570

| Pigments | Dispersant EFKA4330 | Color points by C light x | y | Y | Film thickness (vs. PY138 composition) |
|---|---|---|---|---|---|
| C.I. PG36: 0.75 g TAPP: 0.25 g | 0.40 g | 0.300 | 0.570 | 62.8 | 1.26 µm (67.7%) |
| C.I. PG36: 0.50 g C.I. PY138: 0.50 g | 0.40 g | 0.300 | 0.570 | 62.0 | 1.86 µm (100%) |
| C.I. PG36: 0.60 g C.I. PY150: 0.40 g | 0.40 g | 0.300 | 0.570 | 60.1 | 1.53 µm (82.3%) |

Pigment ratio and layer thickness of the samples are adjusted to give x=0.290, y=0.600, which is EBU specification widely adopted as the standard color for TV system (FIG. 1).

| Pigments | Dispersant EFKA4330 | Color points by C light x | y | Y | Film thickness (vs. PY138 composition) |
|---|---|---|---|---|---|
| C.I. PG36: 0.72 g TAPP: 0.28 g | 0.40 g | 0.290 | 0.600 | 56.0 | 1.88 µm (60.6%) |
| C.I. PG36: 0.40 g C.I. PY138: 0.60 g | 0.40 g | 0.290 | 0.600 | 55.5 | 3.10 µm (100%) |
| C.I. PG36: 0.55 g C.I. PY150: 0.45 g | 0.40 g | 0.290 | 0.600 | 53.0 | 1.95 µm (62.9%) |

The results indicate that the primidopteridine of present invention gives higher Y value and thinner layer thickness than PY138 and PY150 at fixed x and y value, i.e. better color strength and better brightness, and therefore surprisingly better suitable for color filter application.

TABLE 2

Figure 2:
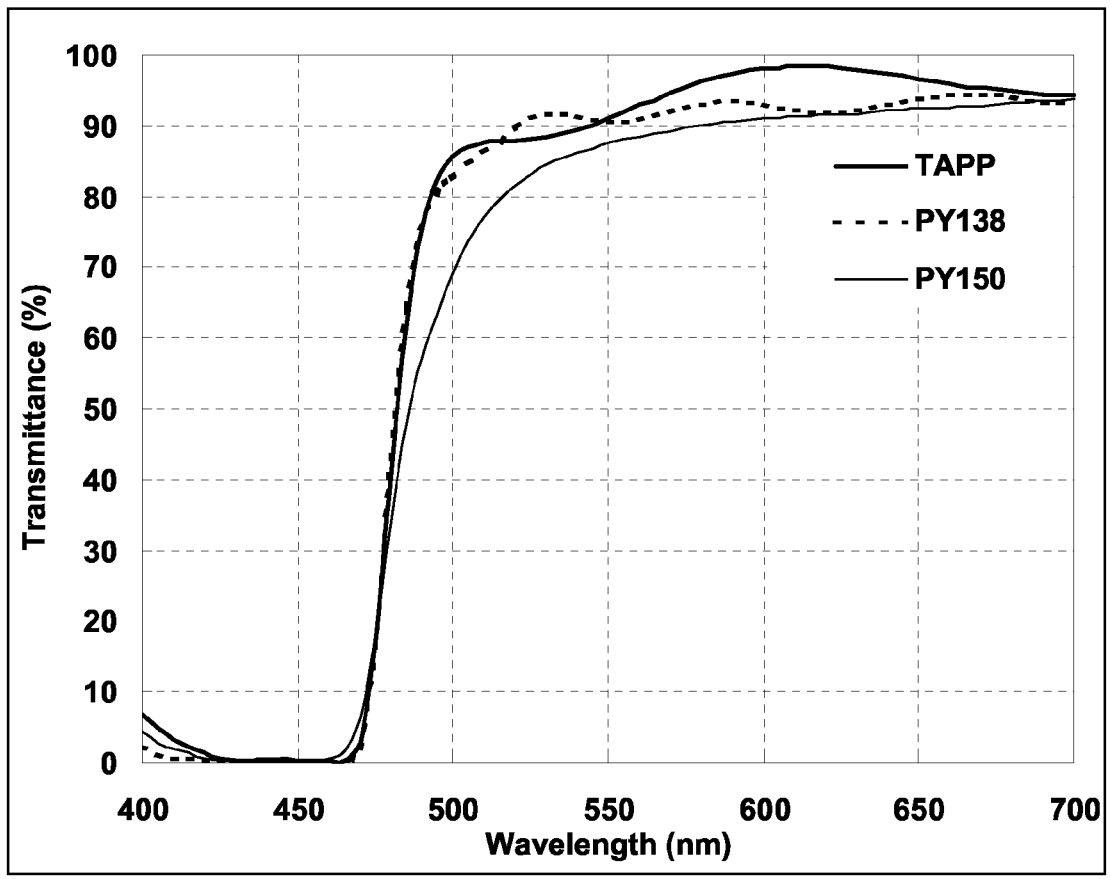
FIG. 2 shows the visible transmission spectra of a yellow dispersion film prepared according to the instant invention comprising the TAPP of formula I vs yellow dispersion films of the existing art, comprising C.I. PY138 or C.I. PY150, wherein the films are adjusted to give a y value of y=0.500.

Optical properties of yellow dispersion films
Thickness of the samples is adjusted to give y = 0.500 (FIG. 2).

| Pigments | Dispersant EFKA 4047 | Color points by C light x | y | Y | Film thickness (vs. PY138 composition) |
|---|---|---|---|---|---|
| TAPP: 1.00 g | 0.40 g | 0.427 | 0.500 | 88.5 | 0.72 µm (62.6%) |
| C.I. PY138: 1.00 g | 0.40 g | 0.414 | 0.500 | 88.0 | 1.15 µm (100%) |
| C.I. PY150: 1.00 g | 0.40 g | 0.429 | 0.500 | 83.5 | 0.85 µm (73.9%) |

The results indicate that the primidopteridine of present invention gives higher Y value and thinner layer thickness than PY138 and PY150 at a fixed y value, i.e. better color strength and better brightness, and therefore surprisingly better suitable for color filter application.

EXAMPLE 4

Micronisation of 2,4,6,8-tetraaminopyrimido[5,4-g]pteridine 2,4,6,8-tetraaminopyrimido[5,4-g]pteridine (TAPP) obtained from Example 1 is micronised by salt kneading using a laboratory kneader with a capacity of 0.75 litter (LUK-075, Werner&Pfleiderer) at 40 rpm under the following conditions;

|  | Substances | | | | Kneading condition | |
| --- | --- | --- | --- | --- | --- | --- |
|  | TAPP | Sodium chloride | Diethylene glycol | Additive | Time | Temperature |
| Example 4-1 | 30 g | 300 g | 85 g | None | 20 hrs. | 40° C. |
| Example 4-2 | 30 g | 300 g | 85 g | None | 20 hrs. | 80° C. |
| Example 4-3 | 30 g | 300 g | 82 g | EFKA4046 7.5 g | 20 hrs. | 40° C. |
| Example 4-4 | 30 g | 300 g | 85 g | EFKA4330 4.3 g | 20 hrs. | 40° C. |
| Example 4-5 | 30 g | 300 g | 83 g | EFKA4406 6.0 g | 20 hrs. | 40° C. |
| Example 4-6 | 30 g | 300 g | 80 g | DB2000 7.5 g | 20 hrs. | 40° C. |
| Example 4-7 | 30 g | 300 g | 83 g | DB2001 6.5 g | 20 hrs. | 40° C. |

After kneading, the mass is put in a 3 litter tool beaker with 2 litter of deionised water and stirred with a lab mixer for 3 hours, the resulting mixture is discharged onto a Buchner funnel and the material in the funnel is washed with deionised water until the filtrate is salt-free. The product is dried at 80° C. for 15 hours then sieved through a sieve with a mesh size of 0.3 mm.

Figure 3:
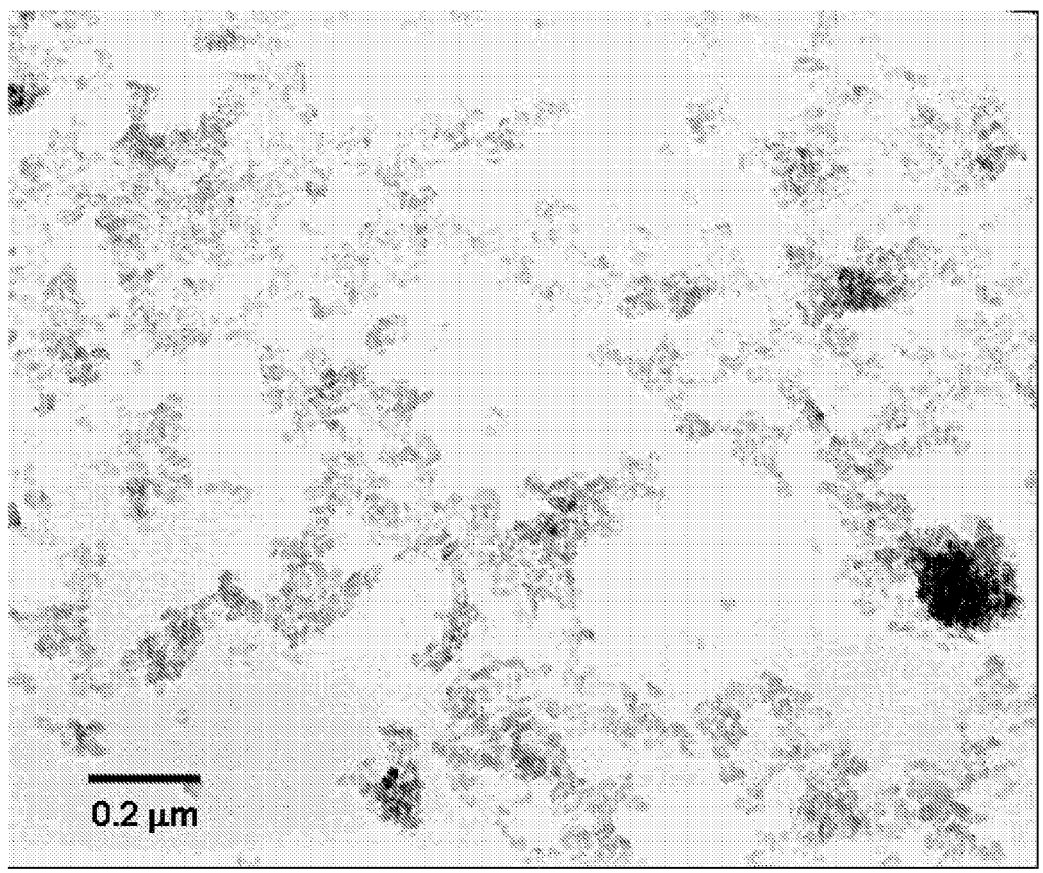
FIG. 3 is a transmission electron microscope picture of the TAPP pigment TAPP of formula I micronized to be less than 0.1 μm according to Example 4-3.

The pigments thus obtained are well micronised to be less than 0.1 μm confirmed by a transmission electron microscope. FIG. 3 shows a microscope picture of Example 4-3.

The micronised products are applied to color filter testing in the same manner as Example 3. Additionally, contrast ratio of the color filter is measured by use of a contrast meter (CT-1, Tubosaka Electric). Dispersant used for making dispersion are EFKA series of EFKA Additives, Disperbyke (DB) series of BYK Chemie, Solsperse (SS) series of Lubrizol and Ajisper PB and PA series of Ajinomoto Fine Techno. The results are summarised in Table 3 and 4.

TABLE 3

Optical properties of green dispersion films
PG36/micronised TAPP ratio is fixed to 70/30 and layer thickness of the samples are adjusted to give y = 0.570.

Pigments
C.I. PG36: 0.7 g
Micronised
TAPP: 0.3 g

| Micronised TAPP | Dispersant | Color points by C light | | | Contrast ratio at |
| --- | --- | --- | --- | --- | --- |
|  |  | x | y | Y | y = 0.570 |
| Example 4-3 | EFKA4046: 0.90 g | 0.289 | 0.570 | 62.2 | 1920 |
| Example 4-3 | EFKA4047: 1.03 g | 0.291 | 0.570 | 62.2 | 1850 |
| Example 4-3 | EFKA4330: 0.51 g | 0.292 | 0.570 | 62.6 | 2010 |
| Example 4-3 | EFKA4340: 0.65 g | 0.291 | 0.570 | 62.7 | 1950 |
| Example 4-3 | EFKA4400: 0.90 g | 0.302 | 0.570 | 57.6 | 1050 |
| Example 4-3 | EFKA4401: 0.72 g | 0.292 | 0.570 | 60.7 | 1620 |
| Example 4-3 | EFKA4402: 0.90 g | 0.291 | 0.570 | 62.8 | 1850 |
| Example 4-3 | EFKA4403: 0.65 g | 0.313 | 0.570 | 50.4 | 1030 |
| Example 4-3 | EFKA4406: 0.72 g | 0.292 | 0.570 | 63.0 | 2070 |
| Example 4-3 | EFKA4510: 0.72 g | 0.301 | 0.570 | 59.4 | 1250 |
| Example 4-3 | EFKA4530: 0.72 g | 0.301 | 0.570 | 58.1 | 1030 |
| Example 4-3 | EFKA4570: 0.60 g | 0.292 | 0.570 | 62.2 | 1720 |
| Example 4-3 | DB163: 0.80 g | 0.292 | 0.570 | 62.8 | 1970 |
| Example 4-3 | DB168: 1.20 g | 0.295 | 0.570 | 63.0 | 1780 |
| Example 4-3 | DB170: 1.20 g | 0.296 | 0.570 | 63.4 | 1740 |
| Example 4-3 | DB180: 1.20 g | 0.294 | 0.570 | 60.0 | 1450 |
| Example 4-3 | DB2000: 0.90 g | 0.292 | 0.570 | 63.2 | 1950 |
| Example 4-3 | DB2001: 0.78 g | 0.295 | 0.570 | 63.4 | 2140 |
| Example 4-3 | PB821: 0.36 g | 0.300 | 0.570 | 63.0 | 1180 |
| Example 4-3 | PB823: 0.36 g | 0.291 | 0.570 | 62.5 | 1640 |
| Example 4-3 | PA111: 0.36 g | 0.298 | 0.570 | 59.6 | 1530 |

TABLE 3-continued

Optical properties of green dispersion films
PG36/micronised TAPP ratio is fixed to 70/30 and layer thickness of the samples are adjusted to give y = 0.570.

Pigments
C.I. PG36: 0.7 g
Micronised
TAPP: 0.3 g

| Micronised TAPP | Dispersant | Color points by C light | | | Contrast ratio at |
| --- | --- | --- | --- | --- | --- |
|  |  | x | y | Y | y = 0.570 |
| Example 4-3 | SS24000: 0.36 g | 0.290 | 0.570 | 61.3 | 1260 |
| Example 4-3 | SS31845: 0.80 g | 0.287 | 0.570 | 61.6 | 2000 |
| Example 4-3 | SS32550: 0.72 g | 0.291 | 0.570 | 62.2 | 1480 |
| Example 4-3 | SS34750: 0.72 g | 0.291 | 0.570 | 62.3 | 1730 |
| Example 4-3 | SS36600: 0.72 g | 0.292 | 0.570 | 62.7 | 2030 |
| Example 4-3 | SS41090: 0.40 g | 0.291 | 0.570 | 62.7 | 1690 |
| Example 4-3 | SS53095: 0.38 g | 0.292 | 0.570 | 62.4 | 1380 |
| Example 4-3 | EFKA6230: 0.10 g BD2001: 0.65 g | 0.295 | 0.570 | 63.3 | 1890 |
| Example 4-3 | EFKA6745: 0.10 g DB2001: 0.65 g | 0.268 | 0.570 | 56.6 | 2070 |
| Example 4-3 | SS12000: 0.10 g DB2001: 0.65 g | 0.253 | 0.570 | 52.8 | 2200 |
| Example 4-4 | EFKA4330: 0.51 g | 0.293 | 0.570 | 63.2 | 1670 |
| Example 4-4 | EFKA4406: 0.72 g | 0.291 | 0.570 | 62.9 | 2090 |
| Example 4-4 | DB2001: 0.78 g | 0.290 | 0.570 | 62.6 | 2050 |
| Example 4-5 | EFKA4406: 0.72 g | 0.293 | 0.570 | 63.4 | 2170 |
| Example 4-5 | DB2001: 0.78 g | 0.292 | 0.570 | 62.8 | 1940 |
| Example 4-7 | EFKA4406: 0.72 g | 0.297 | 0.570 | 63.8 | 1870 |
| Example 4-7 | DB2001: 0.78 g | 0.292 | 0.570 | 62.6 | 1950 |

TABLE 4

Optical properties of the micronised TAPP dispersion films
Thickness of the samples is adjusted to give y = 0.505.

| Pigment Micronised TAPP | Dispersant | Color points by C light | | | Contrast ratio at |
| --- | --- | --- | --- | --- | --- |
|  |  | x | y | Y | y = 0.505 |
| Example 4-1: 1.0 g | EFKA4046: 0.9 g | 0.429 | 0.505 | 87.2 | 852 |
| Example 4-2: 1.0 g | EFKA4046: 0.9 g | 0.428 | 0.505 | 88.1 | 903 |
| Example 4-3: 1.0 g | EFKA4046: 0.9 g | 0.425 | 0.505 | 89.8 | 1050 |
| Example 4-4: 1.0 g | EFKA4046: 0.9 g | 0.426 | 0.505 | 89.6 | 994 |
| Example 4-5: 1.0 g | EFKA4046: 0.9 g | 0.424 | 0.505 | 89.7 | 925 |
| Example 4-6: 1.0 g | EFKA4046: 0.9 g | 0.428 | 0.505 | 89.2 | 920 |
| Example 4-7: 1.0 g | EFKA4046: 0.9 g | 0.427 | 0.505 | 89.8 | 940 |

The results indicate that the primidopteridines of present invention micronised to be less than 0.1 μm, optionally further treated with additives, are particularly suitable for color filter application.

EXAMPLE 5

Preparation of Red Color Filter Consisting of pyrimido[5,4-g]pteridine 2,4,6,8-tetraaminopyrimido[5,4-g]pteridine (TAPP) micronised in Example 4 is adopted to red color filters.

Pigments Used for the Examples:
C.I. Pigment Red 254: IRGAPHORE RED BT-CF, Ciba Specialty Chemicals
C.I. Pigment Yellow 139: IRGAPHORE YELLOW 2R-CF, Ciba Specialty Chemicals Color filter testing is carried out in the same manner as Example 3. The results are summarized in Table 5.

TABLE 5

Figure 4:
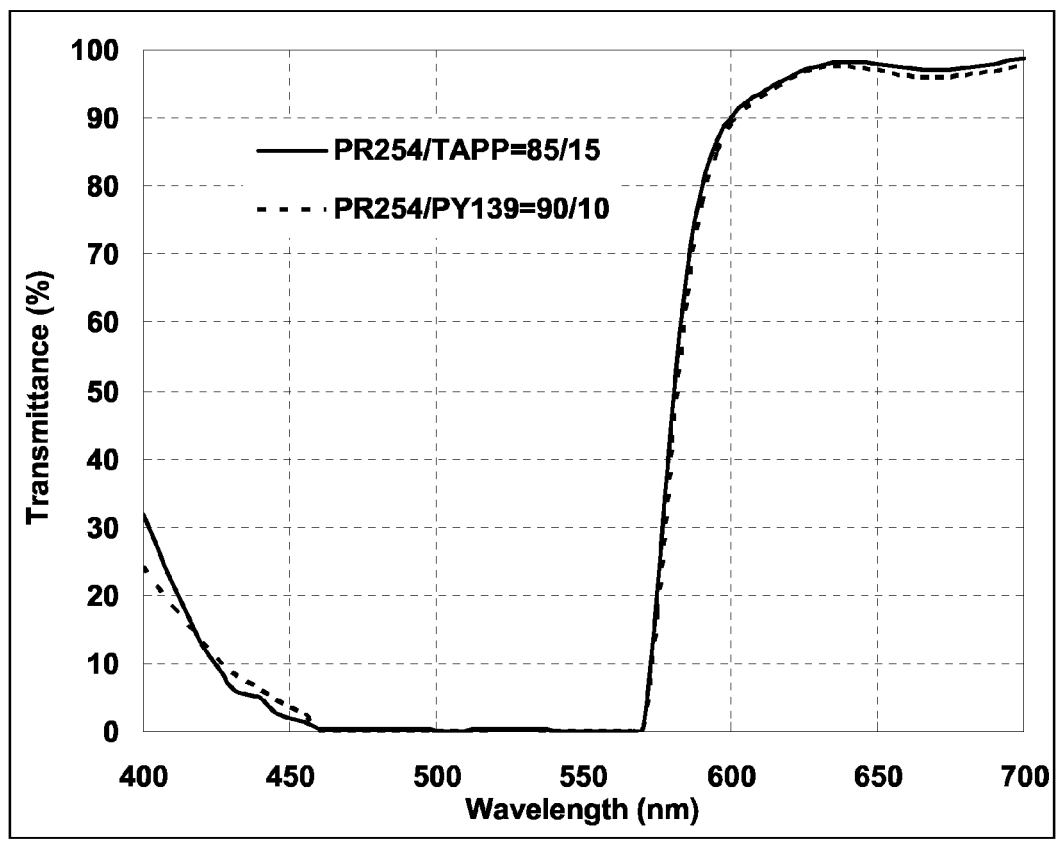
FIG. 4 shows the visible transmission spectra of a red dispersion film prepared according to the instant invention comprising C.I. PR 254 and the TAPP of formula I micronized according to Example 4-3, vs a red dispersion film of the existing art, comprising C.I. PR 254 and C.I. Pigment Yellow 139, wherein the films are adjusted to give a color with an x and y value of x=0.610 and y=0.333.

Optical properties of red dispersion films
Pigment ratio and layer thickness of the samples are adjusted to give x = 0.610 and y = 0.333 (FIG. 4).

| Pigment | Dispersant | Color points by C light | | | |
|---|---|---|---|---|---|
| | | x | y | Y | Thickness |
| C.I. PR254: 0.85 g Example 4-3: 0.15 g | PB821: 0.36 g | 0.610 | 0.333 | 26.4 | 0.60 μm |
| C.I. PR254: 0.90 g C.I. PY139: 0.10 g | PB821: 0.36 g | 0.610 | 0.333 | 25.7 | 0.65 μm |

The results indicate that the primidopteridine of present invention gives higher Y value and thinner layer thickness than PY139 at fixed x and y value, i.e. better brightness and color strength, and therefore surprisingly better suitable for red color filter application.

The invention claimed is:

1. A polymerizable mixture for making color filters comprising
   (a) 0.05 to 70% by weight based on the sum of (a) and (b) of at least one pyrimido[5,4-g]pteridine derivative of formula (I)

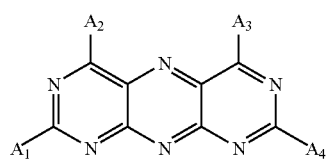

wherein
   $A_1$, $A_2$, $A_3$, and $A_4$ are $NH_2$, and
   (b) 30 to 99.1% by weight based on the sum of (a) and (b) of at least one colorant selected from the group consisting of phthalocyanine, diketopyrrolopyrrole and disazo condensation pigments, and
   at least one ethylenically unsaturated polymerizable compound.

2. A polymerizable mixture for making color filters according to claim 1 comprising
   (a) 15 to 30% by weight based on the sum of (a) and (b) of at least one pyrimido[5,4-g]pteridine derivative of formula (I)

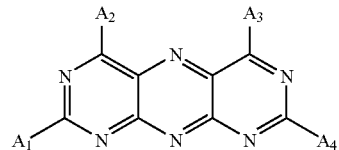

wherein
   $A_1$, $A_2$, $A_3$, and $A_4$ are $NH_2$, and
   (b) 70 to 85% by weight based on the sum of (a) and (b) of at least one colorant selected from the group consisting of phthalocyanine, diketopyrrolopyrrole and disazo condensation pigments, and
   at least one ethylenically unsaturated polymerizable compound.

3. A photopolymerizable mixture for making color filters according to claim 1.

4. A polymerizable mixture for making color filters comprising
   (a) 0.05 to 70% by weight based on the sum of (a) and (b) of at least one pyrimido[5,4-g]pteridine derivative of formula (I)

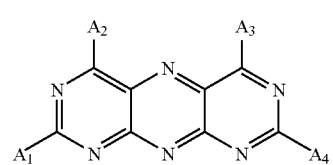

wherein
   $A_1$, $A_2$, $A_3$, and $A_4$ are $NH_2$ and
   (b) 30 to 99.1% by weight based on the sum of (a) and (b) of at least one colorant selected from the group consisting of C. I. Pigment Red 177, 185, 242, 254, 255, 264, 272 and a phthalocyanine of formula (II)

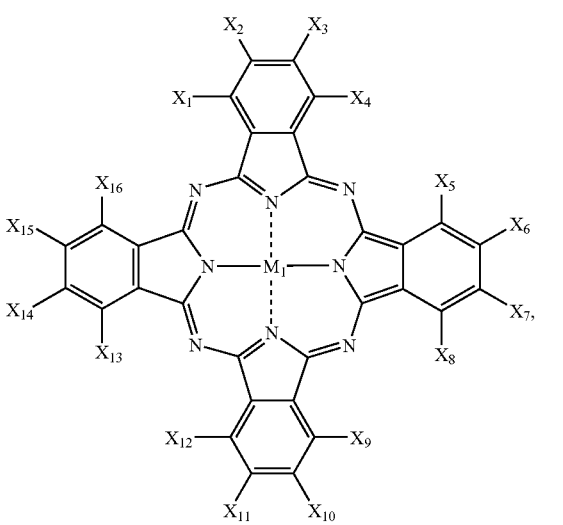

wherein $M_1$ is $H_2$, Cu or Zn, and $X_1$ to $X_{16}$ are independently of each other H, Br or Cl and at least one ethylenically unsaturated polymerizable compound.

5. The polymerizable mixture of claim 4 wherein the at least one colorant is a phthalocyanine of formula (II).

6. The polymerizable mixture of claim 4 wherein the at least one colorant is C. I. Pigment Red 177, 185, 242, 254, 255, 264 or 272.

7. The polymerizable mixture of claim 4 wherein the at least one colorant is selected from the group consisting of C. I. Pigment Green 7, C. I. Pigment Green 36, a chlorinated zinc phthalocyanine, a brominated zinc phthalocyanine and a zinc phthalocyanine which is chlorinated and brominated.

8. The polymerizable mixture of claim 6 wherein the at least one colorant is C. I. Pigment Red 177 or C. I. Pigment Red 254.

9. A color filter comprising a colorant composition comprising a mixture of
(a) 0.05 to 70% by weight based on the sum of (a) and (b) of at least one pyrimido[5,4-g]pteridine derivative of formula (I)

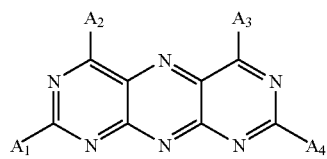

(I)

wherein
$A_1, A_2, A_3,$ and $A_4$ are $NH_2$, and
(b) 30 to 99.1% by weight based on the sum of (a) and (b) of at least one colorant selected from the group consisting of phthalocyanine, diketopyrrolopyrrole and disazo condensation pigments.

10. A color filter according to claim 9 comprising a colorant composition comprising a mixture of
(a) 15 to 30% by weight based on the sum of (a) and (b) of at least one pyrimido[5,4-g]pteridine derivative of formula (I)

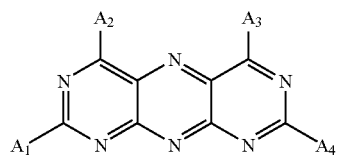

(I)

wherein
$A_1, A_2, A_3,$ and $A_4$ are $NH_2$, and
(b) 70 to 85% by weight based on the sum of (a) and (b) of at least one colorant selected from the group consisting of phthalocyanine, diketopyrrolopyrrole and disazo condensation pigments.

11. A color filter comprising a colorant composition comprising a mixture of
(a) 0.05 to 70% by weight based on the sum of (a) and (b) of at least one pyrimido[5,4-g]pteridine derivative of formula (I)

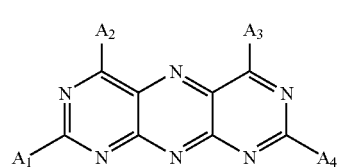

(I)

wherein
$A_1, A_2, A_3,$ and $A_4$ are $NH_2$, and
(b) 30 to 99.1% by weight based on the sum of (a) and (b) of at least one colorant selected from the group consisting of C. I. Pigment Red 177, 185, 242, 254, 255, 264, 272 and a phthalocyanine of formula (II)

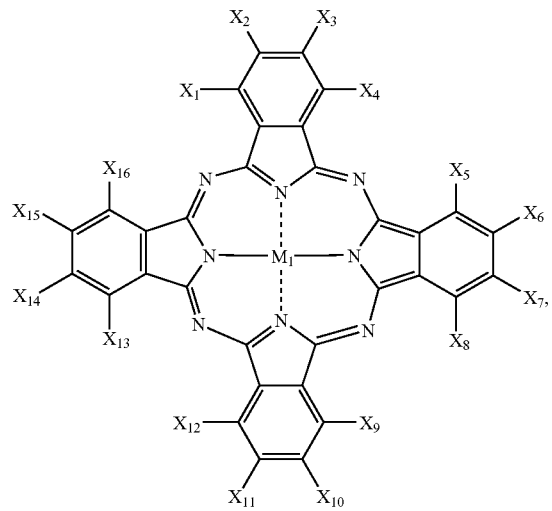

(II)

wherein $M_1$ is $H_2$, Cu or Zn, and $X_1$ to $X_{16}$ are independently of each other H, Br or Cl.

* * * * *